(12) United States Patent
Slobodin

(10) Patent No.: US 11,170,700 B1
(45) Date of Patent: Nov. 9, 2021

(54) ARTIFICIAL WINDOW AND METHOD FOR MANUFACTURING THE SAME

(71) Applicant: a.u. Vista, Inc., Irvine, CA (US)

(72) Inventor: David Slobodin, Irvine, CA (US)

(73) Assignee: A.U. VISTA, INC., Irvine, CA (US)

( * ) Notice: Subject to any disclaimer, the term of this patent is extended or adjusted under 35 U.S.C. 154(b) by 16 days.

(21) Appl. No.: 16/879,393

(22) Filed: May 20, 2020

(51) Int. Cl.
*G09G 3/32* (2016.01)
*G06T 11/00* (2006.01)
*G09G 3/34* (2006.01)

(52) U.S. Cl.
CPC ............... *G09G 3/32* (2013.01); *G06T 11/00* (2013.01); *G09G 3/3406* (2013.01); *G09G 2320/068* (2013.01)

(58) Field of Classification Search
CPC .. G09G 3/32; G09G 3/3406; G09G 2320/068; G06T 11/00
See application file for complete search history.

(56) References Cited

U.S. PATENT DOCUMENTS

| | | | |
|---|---|---|---|
| 6,380,994 B1 | 4/2002 | Iigahama et al. | |
| 9,342,467 B1 | 5/2016 | McGrath et al. | |
| 2008/0043490 A1* | 2/2008 | Coleman | G02F 1/133606 362/623 |
| 2010/0253769 A1* | 10/2010 | Coppeta | G02B 30/24 348/58 |
| 2014/0063077 A1* | 3/2014 | Wetzstein | H04N 13/366 345/690 |
| 2017/0142809 A1* | 5/2017 | Paolini | H05B 47/19 |
| 2017/0196066 A1* | 7/2017 | Dong | H05B 45/22 |
| 2017/0217367 A1* | 8/2017 | Pflug | B60Q 3/18 |
| 2017/0219828 A1 | 8/2017 | Tsai et al. | |
| 2017/0257925 A1* | 9/2017 | Forbis | F21V 3/00 |
| 2018/0164597 A1* | 6/2018 | Bell | G09G 3/003 |
| 2019/0079287 A1 | 3/2019 | Kim et al. | |
| 2019/0154886 A1 | 5/2019 | Huang et al. | |

* cited by examiner

*Primary Examiner* — Grace Q Li
(74) *Attorney, Agent, or Firm* — Tim Tingkang Xia, Esq.; Locke Lord LLP

(57) ABSTRACT

An artificial window is provided. In one example, the artificial window includes a transparent light emitting diode (LED) display panel, and a directional backlight module located at a back side of the transparent LED display panel. The transparent LED display panel includes multiple first LEDs to display at least one image frame, and the directional backlight module includes multiple second LEDs forming a directional LED array to generate a collimated directional light toward the transparent LED display. In another example, the artificial window includes a display panel to display at least one image frame; and a backlight module located at a back side of the display panel. The backlight module includes a first light source providing backlight for the display panel, and a second light source to generate a collimated directional light.

27 Claims, 23 Drawing Sheets

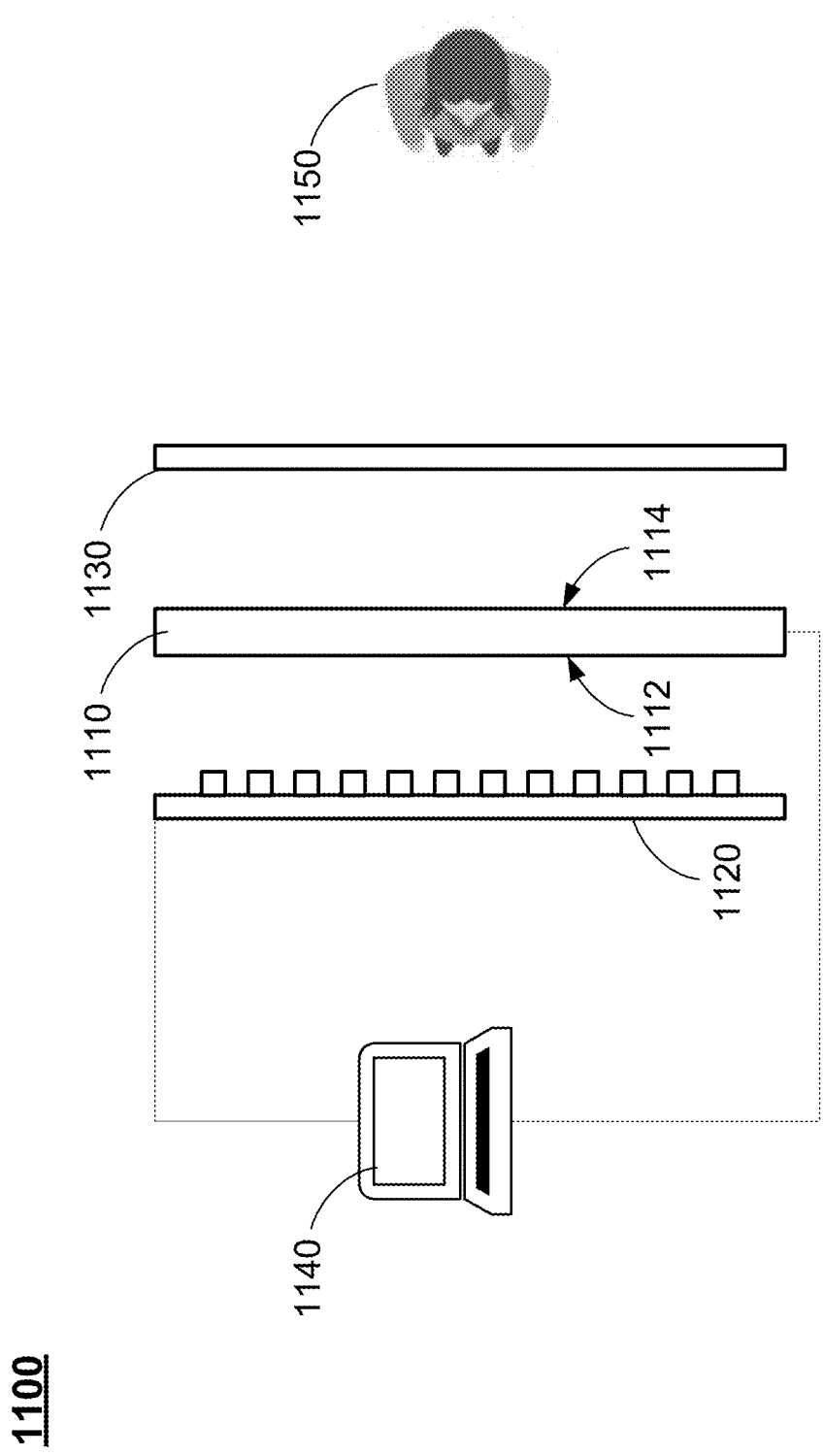

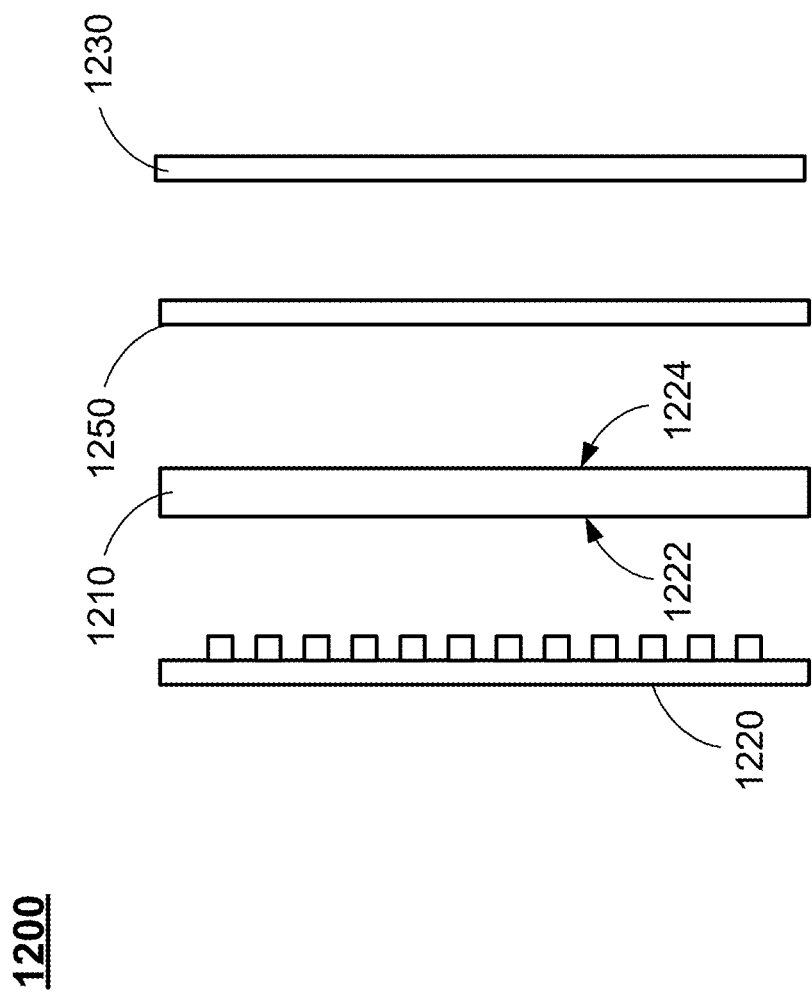

ARTIFICIAL WINDOW AND METHOD FOR MANUFACTURING THE SAME

FIELD

The disclosure relates generally to display technology, and more particularly to an artificial window and methods for manufacturing the same.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Artificial or virtual windows enhance living and work environments by providing attractive real-world scenery in locations where a real window is not feasible or desirable. For example, an existing artificial window is formed by recessing and framing a backlit photographic transparency within a wall, where the position, size and framing are analogous to a real window. While the existing artificial or virtual window can be made with a relatively low cost and capable of displaying images with high resolution, the images being displayed may lack some important qualities such that they are unlike scenery viewed through a real-world window, and thus do not look very realistic. As a result, the existing artificial window does not really achieve the desired positive psychological effects.

Therefore, a heretofore unaddressed need exists in the art to address the aforementioned deficiencies and inadequacies.

SUMMARY

One aspect of the disclosure relates to an artificial window, which includes: a transparent light emitting diode (LED) display panel having a back side and a display side opposite to each other, wherein the transparent LED display panel comprises a plurality of first LEDs configured to display at least one image frame; and a directional backlight module located at the back side of the transparent LED display panel, wherein the directional backlight module comprises a plurality of second LEDs forming a directional LED array configured to generate a collimated directional light toward the transparent LED display panel.

In certain embodiments, the second LEDs simulate a natural light effect for the at least one image frame displayed by the transparent LED display panel.

In certain embodiments, the artificial window further includes an optical component located at the display side of the transparent LED display panel, configured to increase a perception of depth of the at least one image frame displayed by the transparent LED display panel. In one embodiment, the optical component is a Fresnel lens or a metalens.

In certain embodiments, the artificial window further includes a computing device comprising a processor and a storage device storing computer executable code, wherein the computer executable code, when executed at the processor, is configured to analyze a plurality of control factors to determine a plurality of parameters of the collimated directional light, and control the second LEDs to generate the collimated directional light based on the parameters of the collimated directional light.

In certain embodiments, the parameters of the collimated directional light include: a degree of collimation of the collimated directional light; a principle direction of the collimated directional light; luminance of the collimated direction light; and chromaticity of the collimated direction light.

In certain embodiments, the principle direction of the collimated directional light includes an azimuth angle θ and an elevation angle (p.

In certain embodiments, the control factors include at least one of: date and time information; location information of the artificial window; orientation information of the artificial window; weather information; and obscuration information related to the at least one image frame.

In certain embodiments, the computing device is configured to analyze the at least one image frame and the control factors to determine the parameters of the collimated directional light by: determining, either by analyzing the at least one image frame or based on the weather information, whether the at least one image frame is in a sunny weather or a cloudy weather; in response to determining that the at least one image frame is in sunny weather, determining, by analyzing the at least one image frame, whether the sun is in view in the at least one image frame; in response to determining that the sun is in view, calculating the parameters of the collimated directional light based on sun position in the at least one image frame; and in response to determining that the sun is not in view, calculating the parameters of the collimated directional light based on the date and time information, the location information and the orientation information of the artificial window, or by analyzing shadows in the at least one image frame; and in response to determining the at least one image frame is in the cloudy weather, classifying, by analyzing the at least one image frame, a sky status; calculating a pre-obscuration parameters of the collimated directional light based on the date and time information, the location information and the orientation information of the artificial window, or by analyzing shadows in the at least one image frame; and calculating, based on the pre-obscuration parameters of the collimated directional light and the sky status, the parameters of the collimated directional light.

In certain embodiments, the sun position in the at least one image frame is determined by calculating the sun position based on the date and time information, the location information and the orientation information of the artificial window.

In certain embodiments, the sun position in the at least one image frame is determined by: analyzing the at least one image frame to obtain at least one region of saturated white pixels within the at least one image frame; in response to obtaining only one region of the saturated white pixels, determining the one region as the sun position; and in response to obtaining a plurality of region of the saturated white pixels, selecting one of the plurality of regions as the sun position based on the date and time information, the location information and the orientation information of the artificial window.

Another aspect of the disclosure relates to an artificial window, which includes: a display panel having a back side and a display side opposite to each other, configured to display at least one image frame; and a backlight module, located at the back side of the display panel, comprising a first light source providing backlight for the display panel, and a second light source configured to generate a collimated directional light.

In certain embodiments, the second light source simulates a natural light effect for the at least one image frame displayed by the display panel.

In certain embodiments, the artificial window further includes an optical component located at the display side of the display panel, configured to increase a perception of depth of the at least one image frame displayed by the display panel. In one embodiment, the optical component is a Fresnel lens or a metalens.

In certain embodiments, the first light source is configured to provide a polarized light beam, and the display panel is a liquid crystal display (LCD) panel not having a rear polarizer.

In certain embodiments, the display panel has a polarizer, and each respective frame of the at least one image frame comprises a first half-frame and a second half-frame, wherein: in the first half-frame of each respective frame, the first light source controlled to provide backlight for the display panel to display the respective frame, and the second light source is turned off; and in the second half-frame of each respective frame, the first light source is turned off, and the second light source is controlled to generate the collimated directional light.

In certain embodiments, the artificial window further includes a computing device comprising a processor and a storage device storing computer executable code, wherein the computer executable code, when executed at the processor, is configured to analyze a plurality of control factors to determine a plurality of parameters of the collimated directional light, and control the second light source to generate the collimated directional light based on the parameters of the collimated directional light.

In certain embodiments, the parameters of the collimated directional light include: a degree of collimation of the collimated directional light; a principle direction of the collimated directional light; luminance of the collimated direction light; and chromaticity of the collimated direction light.

In certain embodiments, the principle direction of the collimated directional light includes an azimuth angle $\theta$ and an elevation angle $\varphi$.

In certain embodiments, the control factors include at least one of: date and time information; location information of the artificial window; orientation information of the artificial window; weather information; and obscuration information related to the at least one image frame.

In certain embodiments, the computing device is configured to analyze the at least one image frame and the control factors to determine the parameters of the collimated directional light by: determining, either by analyzing the at least one image frame or based on the weather information, whether the at least one image frame is in a sunny weather or a cloudy weather; in response to determining the at least one image frame is in the sunny weather, determining, by analyzing the at least one image frame, whether the sun is in view in the at least one image frame; in response to determining that the sun is in view, calculating the parameters of the collimated directional light based on sun position in the at least one image frame; and in response to determining that the sun is not in view, calculating the parameters of the collimated directional light based on the date and time information, the location information and the orientation information of the artificial window, or by analyzing shadows in the at least one image frame; and in response to determining the at least one image frame is in the cloudy weather, classifying, by analyzing the at least one image frame, a sky status; calculating a pre-obscuration parameters of the collimated directional light based on the date and time information, the location information and the orientation information of the artificial window, or by analyzing shadows in the at least one image frame; and calculating, based on the pre-obscuration parameters of the collimated directional light and the sky status, the parameters of the collimated directional light.

In certain embodiments, the sun position in the at least one image frame is determined by calculating the sun position based on the date and time information, the location information and the orientation information of the artificial window.

In certain embodiments, the sun position in the at least one image frame is determined by: analyzing the at least one image frame to obtain at least one region of saturated white pixels within the at least one image frame; in response to obtaining only one region of the saturated white pixels, determining the one region as the sun position; and in response to obtaining a plurality of region of the saturated white pixels, selecting one of the plurality of regions as the sun position based on the date and time information, the location information and the orientation information of the artificial window.

In a further aspect of the disclosure, an artificial window includes: a display panel having a back side and a display side opposite to each other, configured to display at least one image frame, wherein the at least one image frame is obtained real-time by a remote camera; a backlight module located at the back side of the display panel, comprise a first light source providing backlight for the display panel, and a second light source configured to generate a collimated directional light; and a computing device communicatively connected to the display panel, the backlight module and the remote camera, the computing device comprising a processor and a storage device storing computer executable code, wherein the computer executable code, when executed at the processor, is configured to: receive the at least one image frame from the remote camera, and generate control data for the display panel based on the at least one image frame; receive a plurality of control factors from the remote camera, and determine a plurality of parameters of the collimated directional light; and control the second light source to generate the collimated directional light based on the parameters of the collimated directional light.

In certain embodiments, the parameters of the collimated directional light include: a degree of collimation of the collimated directional light; a principle direction of the collimated directional light; luminance of the collimated directional light; and chromaticity of the collimated direction light. In one embodiment, the principle direction of the collimated directional light comprises an azimuth angle $\theta$ and an elevation angle $\varphi$.

In certain embodiments, the control factors include at least one of: date and time information; location information of the remote camera; orientation information of the remote camera; weather information; and obscuration information related to the at least one image frame.

In certain embodiments, the computing device is configured to analyze the at least one image frame and the control factors to determine the parameters of the collimated directional light by: determining, either by analyzing the at least one image frame or based on the weather information, whether the at least one image frame is in sunny weather or cloudy weather; in response to determining that the at least one image frame is in sunny weather, determining, by analyzing the at least one image frame, whether the sun is in view in the at least one image frame; in response to determining that the sun is in view, calculating the parameters of the collimated directional light based on sun position in the at least one image frame; and in response to determining that the sun is not in view, calculating the parameters of the collimated directional light based on the date and time information, the location information and the orientation information of the remote camera, or by analyzing shadows in the at least one image frame; and in response to determining the at least one image frame is in cloudy weather, classifying, by analyzing the at least one image frame, a sky status; calculating a pre-obscuration parameters of the collimated directional light based on the date and time information, the location information and the orientation information of the remote camera, or by analyzing shadows in the at least one image frame; and calculating, based on the pre-obscuration parameters of the collimated directional light and the sky status, the parameters of the collimated directional light.

In certain embodiments, the sun position in the at least one image frame is determined by calculating the sun position based on the date and time information, the location information and the orientation information of the remote camera.

In certain embodiment, the sun position in the at least one image frame is determined by: analyzing the at least one image frame to obtain at least one region of saturated white pixels within the at least one image frame; in response to obtaining only one region of the saturated white pixels, determining the one region as the sun position; and in response to obtaining a plurality of regions of the saturated white pixels, selecting one of the plurality of regions as the sun position based on the date and time information, the location information and the orientation information of the remote camera.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 11A shows a side view of an artificial window having a liquid crystal display (LCD) panel and a directional backlight module according to certain embodiments of the present disclosure.

FIG. 12 shows a side view of an artificial window having an additional transparent optical component according to certain embodiments of the present disclosure.

DETAILED DESCRIPTION OF THE DISCLOSURE

Figure 1A:
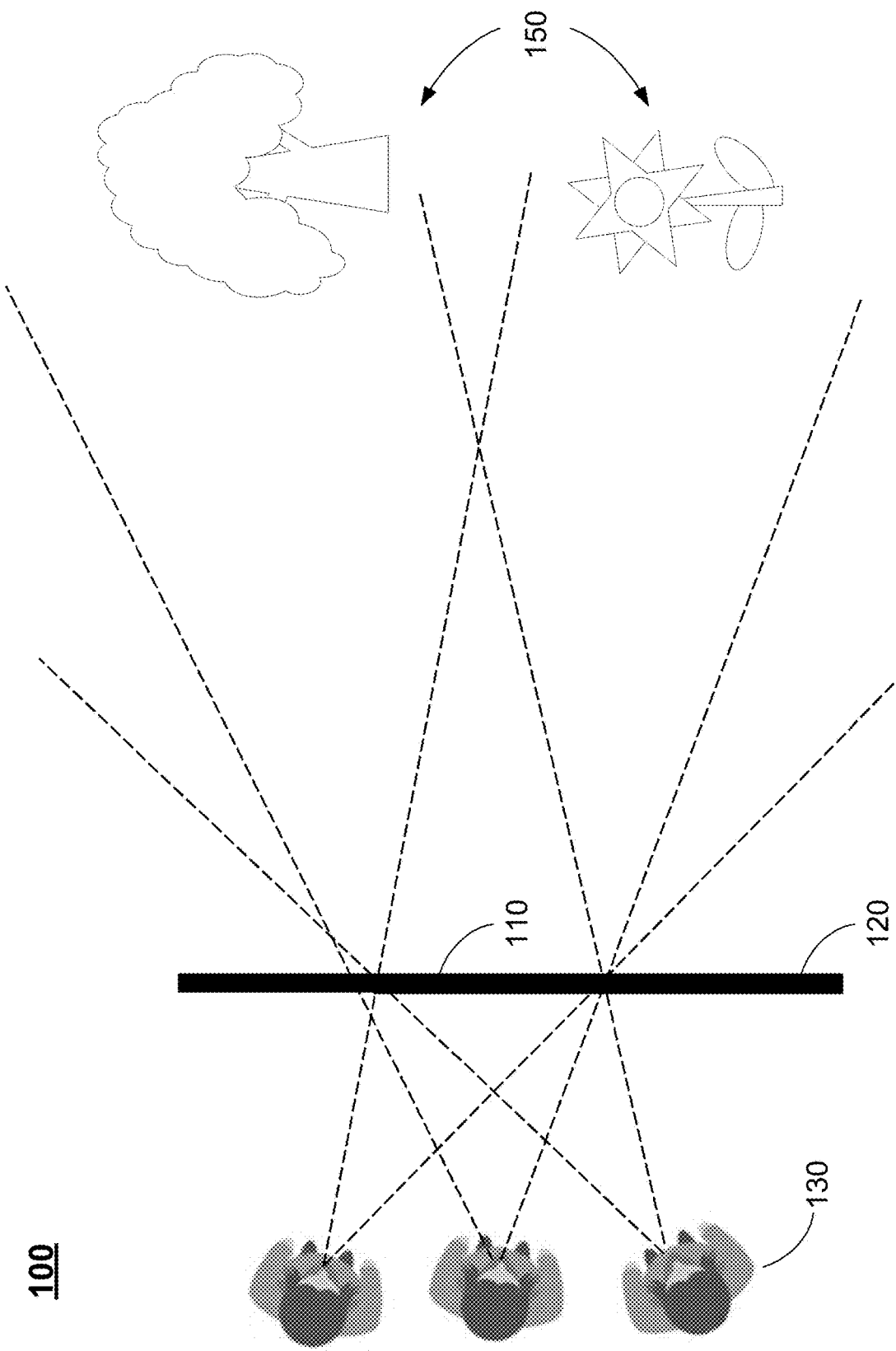
FIG. 1A shows a real window according to certain embodiments of the present disclosure.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings. In accordance with the purposes of this disclosure, as embodied and broadly described herein, this disclosure, in certain aspects, relates to a display panel and a display device using the same.

As discussed above, an existing artificial window is formed by recessing and framing a backlit photographic transparency within a wall, where the position, size and framing are analogous to a real window. In this case, the images being displayed may be still or fixed, unlike scenery viewed through a real-world window. In some cases, a flat panel display may be used instead to provide moving images. The images shown on the flat display could, for example, include video of a real outdoor scene taken by a local or remote camera, enabling people to connect with natural rhythms of sunlight and weather and to observe outdoor activity, such as trees in the wind, ocean, animals, people, traffic, etc. However, the artificial windows based on simply replacing the window glass with a flat panel display do not look very realistic because they lack several important qualities or factors. Examples of these factors may include: (1) the image perspective does not shift when the viewer shifts their head or viewing position, (2) the focal plane of the image appears to be at the plane of the window, not behind the window at the position of object being viewed, (3) individual display pixels may be discernable, (4) the display brightness and color temperature are not natural, (5) the display does not have appropriately bright directional light to cast a shadow, and (6) there is no perception of depth from stereo vision cues. It should be noted that each of these perception factors is not equally weighted. For example, the most important factors for perception of reality are the head-motion parallax, no discernable pixels, natural brightness and color and directional lighting (factors 1, 3, 4 and 5). However, the apparent focal plane and stereo vision cues (factors 2 and 6) are still important and humans are quite sensitive to inconsistencies among factors.

Consequently, one aspect of the disclosure is to provide an artificial window that addresses all the factors sufficiently and consistently to generate a high-quality window simulation. The artificial window according to certain embodiments of the disclosure may be configured to minimize cost for affordability, and to maintain a thin form factor for practical application and easier installation.

Figure 1B:
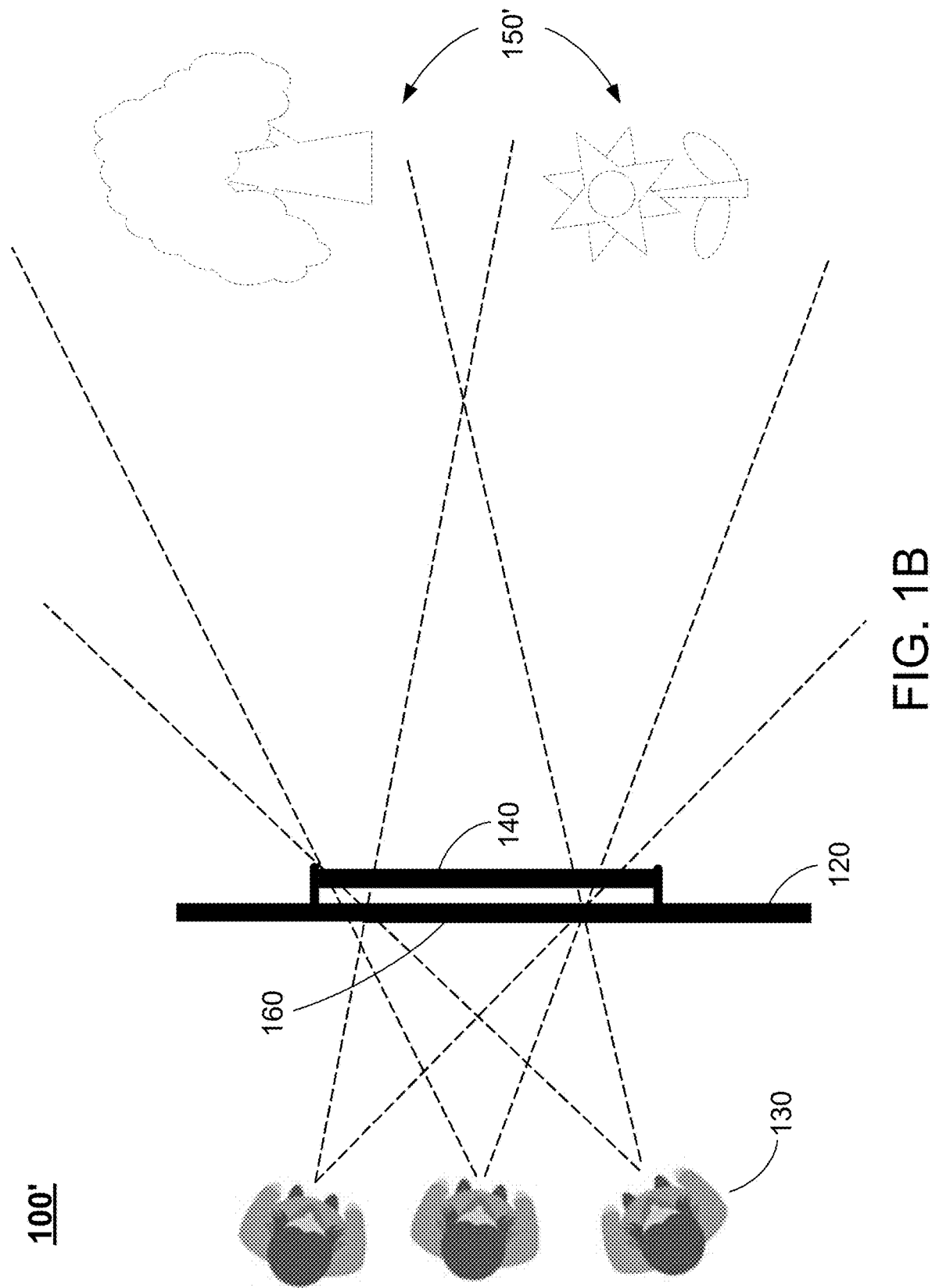
FIG. 1B shows an artificial window according to certain embodiments of the present disclosure.

FIG. 1A shows a real window according to certain embodiments of the present disclosure, and FIG. 1B shows an artificial window according to certain embodiments of the present disclosure. As shown in FIG. 1A, a real window 110, which may be a transparent glass, is provided on a wall 120, and a viewer 130 in front of the real window 110 may shift among different positions (more specifically, the viewer's head may move among the different positions) while viewing through the real window 110 to perceive the outdoor scenery, which may be formed by a plurality of objects 150. In this case, the viewer 130 has an effective field of view afforded by the window 110 and the distance of the viewer 130 from the window 110. When the viewer 130 shifts between the positions parallel to the window 110, the perceived image appears to shift. The alignment of the window 110 (or the aperture) to the viewer 130 changes, and the viewer 130 is afforded a new perspective of the outdoor scenery. Some of the previous outdoor image is now obscured by the wall 120, and some portions of the outdoor scene that were previously obscured by the wall 120 are now visible. It should be noted that some amount of indoor light is reflected off the surface of the window 110. The outdoor objects 150 being viewed are at a distance from the window 110, and the eyes of the viewer 130 are focused beyond the plane of the window 110.

In comparison, FIG. 1B shows an artificial window 100', in which the window 110 may be removed, leaving an aperture on the wall 120, and a flat panel display 140 may be disposed behind the aperture. The aperture is essentially the apparent opening on the wall 120 to accommodate the artificial window. The flat panel display 140 is configured to display an image corresponding to a plurality of virtual objects 150', such that the viewer 130, when seeing the image, may perceive the virtual objects 150' to be located at the corresponding perceived locations. The flat panel display 160 is larger than the aperture to allow the viewer 130 to see a different perspective of the displayed image depending on where the viewer 130 is standing, provided that the viewer 130 is distanced (e.g., a meter or more) from the artificial window. If the viewer 130 is located right up against the window, there is no perspective change when shifting the viewing position. In some cases, a front optical component 160 may be provided in front of and parallel to the flat panel display 140. For example, as shown in FIG. 1B, the front optical component 160 is embedded in the aperture on the wall 120. Thus, the size of aperture matches the usable area of the front optical component 160. In certain embodiments, the front optical component 160 can be one or several flat (or close to flat) optical elements such as Fresnel lenses. The purpose of the front optical component 160 is to create a virtual image, using the flat panel display 140 without visible pixelization and ideally in a realistically far focal position.

To make an artificial window appear realistic, it is important that the flat panel display 140 as shown in FIG. 1B must be sufficiently bright (e.g., 2000 nits), and include provisions for high dynamic range imaging, since real world scenery can have very high dynamic range. At minimum, the flat panel display 140 should comply with high dynamic range (HDR) standards. Since real world scenery is created by natural light (such as sunlight) reflecting off objects, the color and shadow appearances of the scenery image should change with time of year and time of day. For example, at sunset, there is much higher red content in sunlight and much reduced blue content, and of course the total brightness is less than mid-day. The video scenery displayed on the flat panel display 140 in the artificial window ideally changes with time of day to make it appear realistic and keep the viewer 130 in synchronization with the local environment.

In order to make the image displayed by the artificial window more realistic, directional light and shadow-casting may be added as an additional feature in the artificial window. The concept of providing the directional light in the artificial window is to simulate a natural light effect (e.g., sunlight). In the case of a real window, the natural light may or may not transmit through the real window, depending on factors such as the window orientation, the weather, obscuring objects, time of day and time of year. Correspondingly, for an artificial window to appear realistic, the artificial window must have the capability to project the directional light, which is used to simulate the natural light effect, when appropriate based on the same factors, in order to simulate the scenery of a real window.

Figure 2:
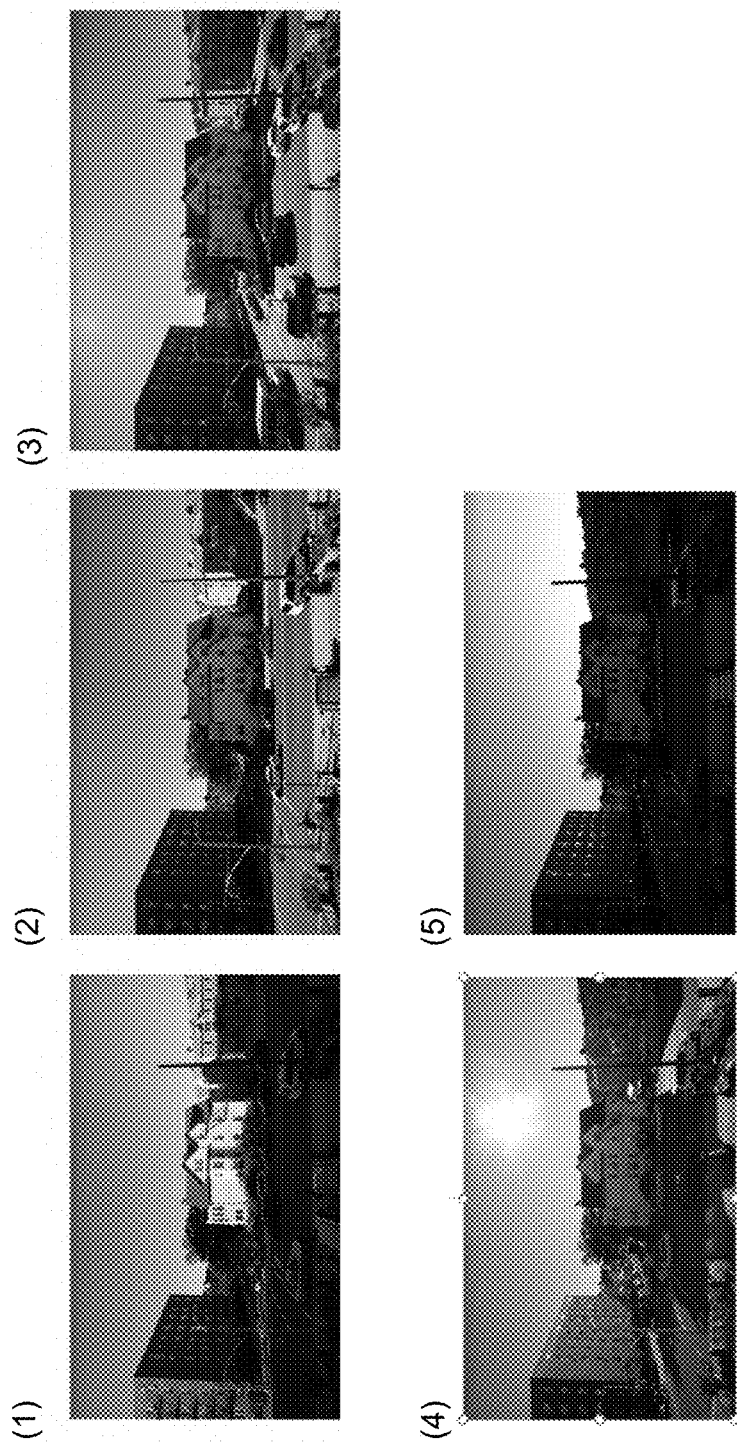
FIG. 2 shows multiple image frames of a scenery at different times of a day according to certain embodiments of the present disclosure.

The directional light must be "directional" because the position of the sun changes over the course of the day. Thus, the directional light must be projectable out of the artificial window over the full range thereof. FIG. 2 shows multiple image frames of a scenery at different times of a day according to certain embodiments of the present disclosure. As shown in FIG. 2, the image of the same scenery includes five different image frames, and each image frame is taken at a different time of the same day. It should be noted that when the weather is clear, it is possible that the sun is directly visible in the scene, as shown in frame (4) of FIG. 2. In this case, the artificial window should project bright collimated light with high intensity from an angle simulating the position of the sun. In other words, when the sky in the scene is clear, the directional light coming from the simulated sun through the artificial window should be highly collimated, like real sunlight. When this occurs, a portion of the image frame would likely be washed out by the extremely bright simulated sunlight, as would occur in the scene of a real window. Even if the sun is not directly visible through the window, sunlight can still project through the window and cast shadows into the room, as shown in frame (3) of FIG. 2. In this case, the directional light does not shine into the eyes of the viewer, but does enter the room.

Figure 3:
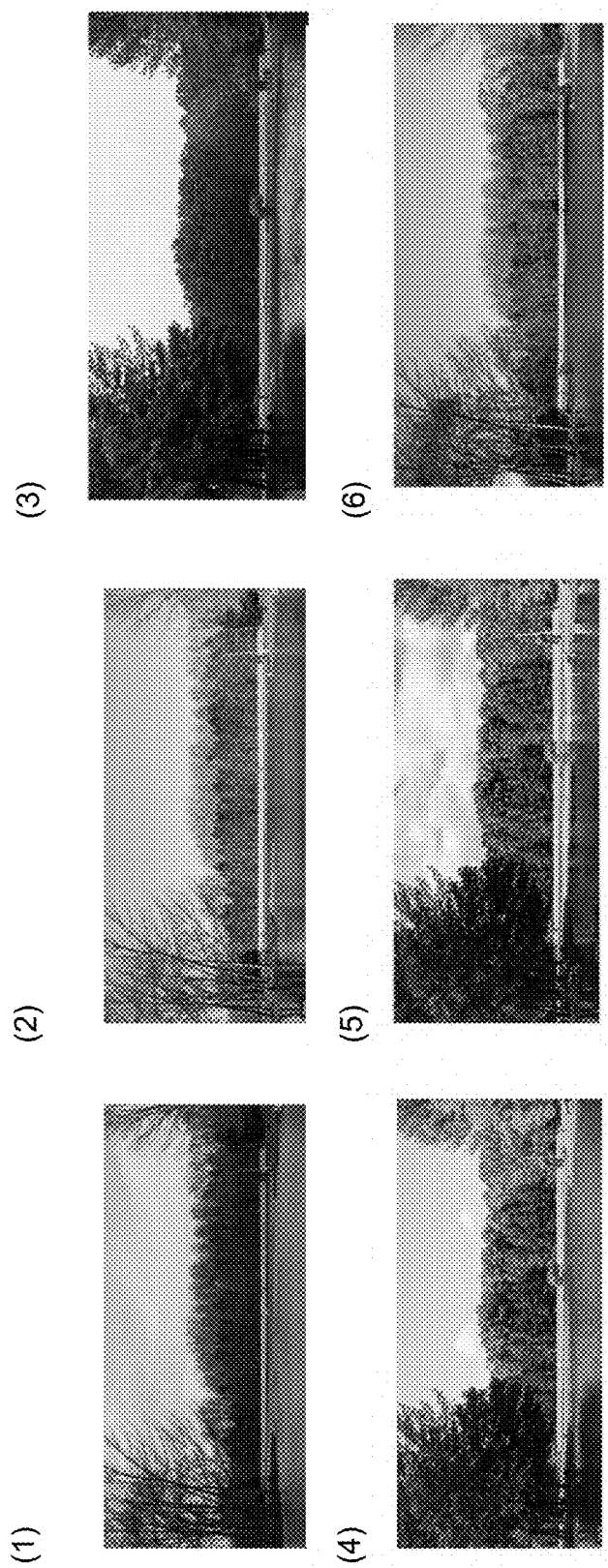
FIG. 3 shows multiple image frames of a scenery at different times of a year according to certain embodiments of the present disclosure.

As discussed above, the directional light should be highly collimated when the sky is clear. However, the degree of collimation and luminance of the directional light may change with the weather and the timing of the year. For example, FIG. 3 shows multiple image frames of a scenery at different times of a year according to certain embodiments of the present disclosure. As shown in FIG. 3, the image of the same scenery includes five different image frames, and each image frame is taken at a different time of the same year with different weather and different degrees of cloudiness. When the sky is fully overcast, such as the frame (3) of FIG. 3, little or no directional light is needed in an artificial window. On the other hand, on partly cloudy days, such as the frame (4) of FIG. 3, some directional light may project through the artificial window, but the light is not completely collimated since the clouds diffuse some of the sunlight.

Based on the discussion above, the directional light provided by the artificial window must be capable of varying between different degrees of collimation and luminance, and must be projectable out of the artificial window over the full range thereof. However, the existing standard displays do not have the capability to provide the directional light while displaying the images. Thus, to be capable of providing the directional light while displaying the images, an artificial window may include two separate modules, including a display module for displaying the images, and a directional backlight module for providing the directional light. Further, a computing device is also required to perform intelligent analysis of the image or video being displayed to control the directional backlight, such that the directional lighting is at the proper angle, brightness, color, directness or diffuseness consistent with the video content, time of day and year and location. In certain embodiment, the intelligent analysis is ideally performed real-time to limit data storage requirements and to maintain maximum flexibility to change the window scenery video as needed. However, in certain embodiments, the intelligent analysis could also be performed in advance if the video is pre-recorded (as opposed to a live video feed) and analysis data could be included with each video stream. In certain embodiments, where for example the artificial window image is provided by a live video feed from a remote camera, the image itself need not be intelligently analyzed. Rather, the computing device determines the directional lighting parameters from the orientation of the video camera as well as the weather conditions (cloudy or sunny) local to the camera.

Figure 4A:
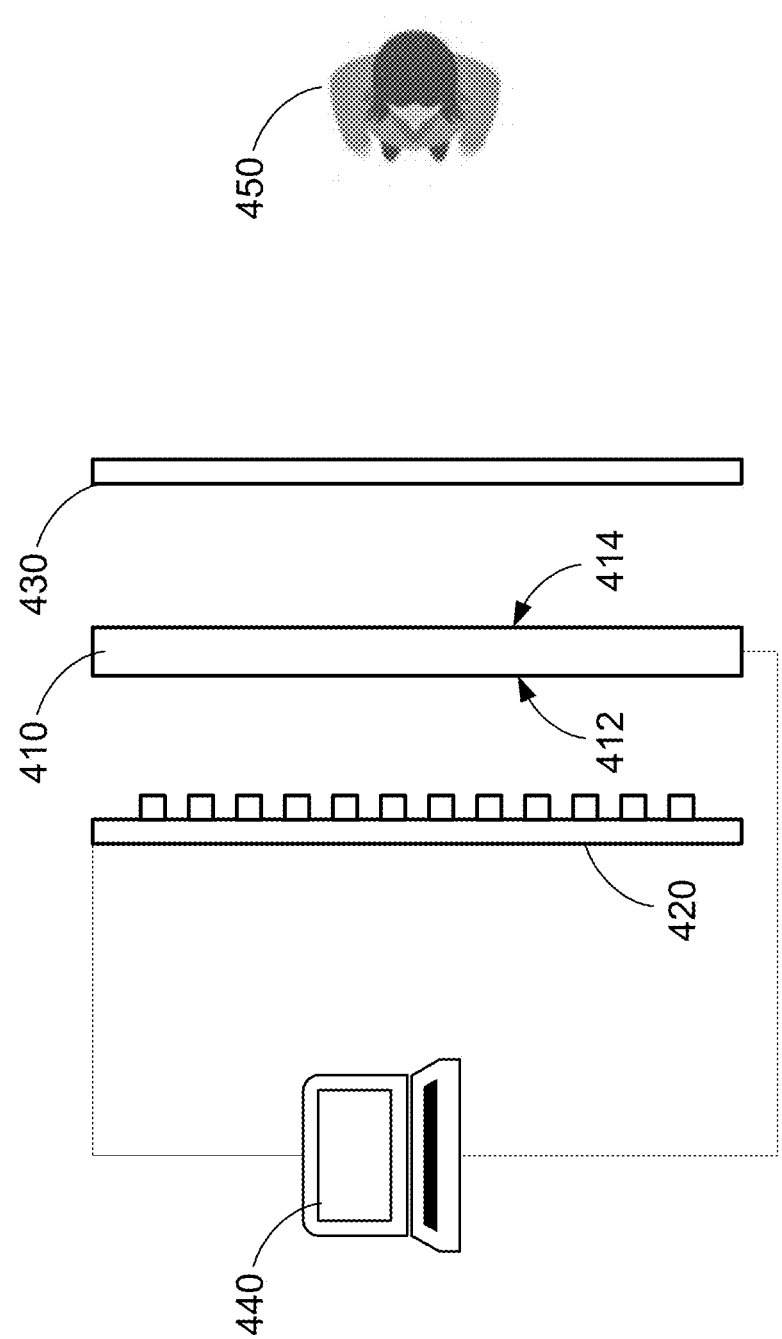
FIG. 4A shows a side view of an artificial window having a transparent light emitting diode (LED) display panel and a directional backlight module according to certain embodiments of the present disclosure.

FIG. 4A shows a side view of an artificial window according to certain embodiments of the present disclosure. As shown in FIG. 4A, the artificial window 400 includes a transparent light emitting diode (LED) display panel 410, a directional backlight module 420, an optical component 430, and a computing device 440. The transparent LED display panel 410 has a back side 412 and a display side 414 opposite to each other, where a viewer 450 is located at the display side 414 of the LED display panel 410 while viewing through the artificial window 400 to perceive the scenery. The transparent LED display panel 410 is used to display a fixed image (which constitutes only one single image frame) or a video (which may include multiple image frames) of the scenery. The directional backlight module 420 is located at the back side 412 of the transparent LED display panel 410 for generating a collimated directional light toward the transparent LED display 410, such that the collimated directional light simulates a natural light effect for the image or the image frames displayed by the transparent LED display panel 410. Since the transparent LED display panel 410 is transparent, the collimated directional light may pass through the transparent LED display panel 410 to be perceived by the viewer 450. The optical component 430 is located at the transparent display side 414 of the LED display panel 410 to increase a perception of depth of the image or the image frames displayed by the transparent LED display panel 410. The computing device 440 is communicatively connected to the transparent LED display panel 410 and the directional backlight module 420 respectively to function as the controlling device for both the transparent LED display panel 410 and the directional backlight module 420.

Figure 4B:
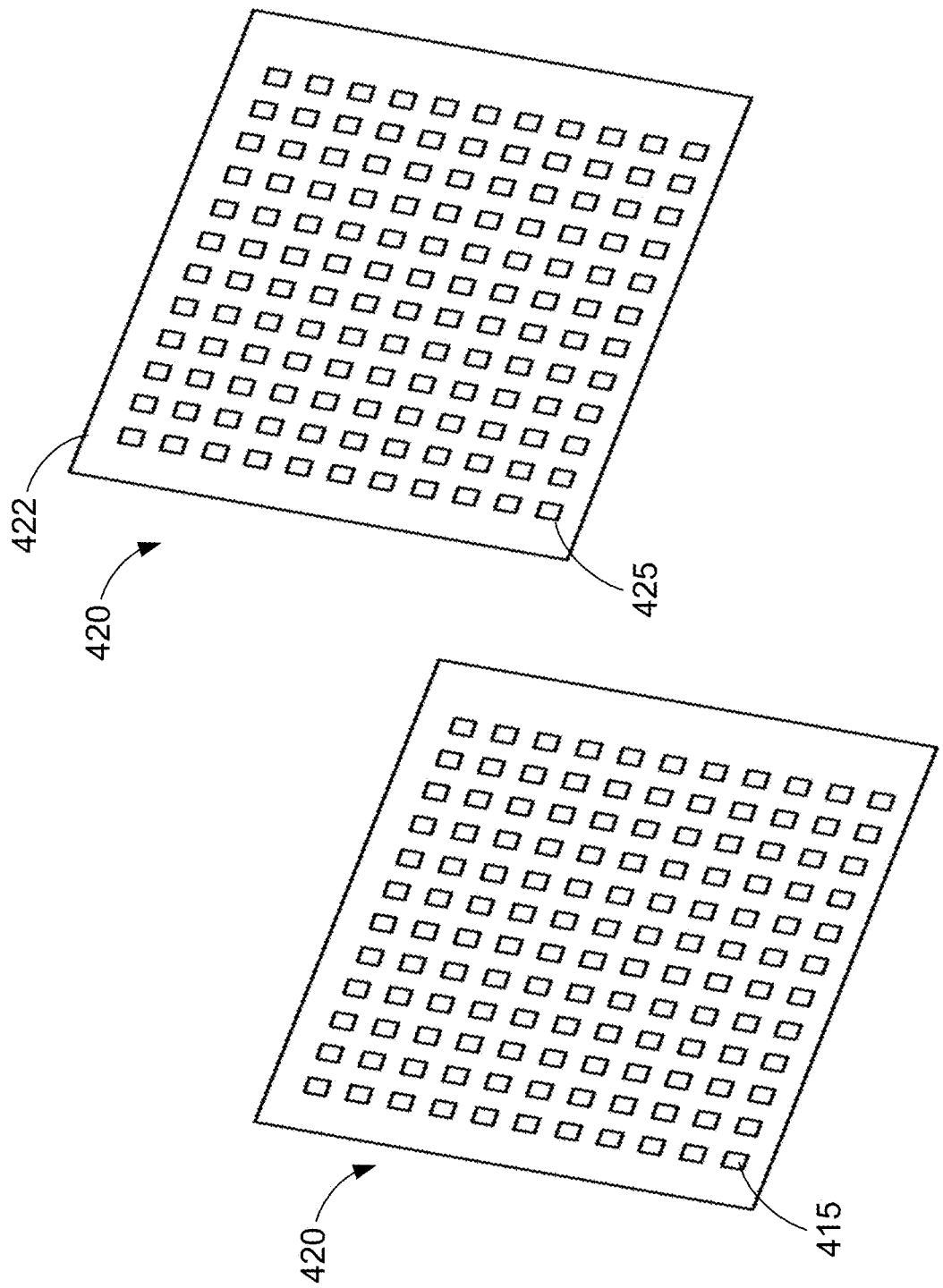
FIG. 4B shows a perspective view of the transparent LED display panel and the directional backlight module as shown in FIG. 4A.

FIG. 4B shows a perspective view of the transparent LED display panel and the directional backlight module as shown in FIG. 4A. As shown in FIG. 4B, the transparent LED display panel 410 includes a plurality of first LEDs 415 arranged in a pixel array, where each of the first LEDs 415 represents a pixel of the transparent LED display panel 410. In certain embodiments, the first LEDs 415 may be organic LEDs (OLEDs), and the transparent LED display panel 410 may be a transparent OLED (TOLED) display panel. In other embodiments, the first LEDs may be inorganic LEDs, such as micro-LEDs. Correspondingly, the directional backlight module 420 includes a plurality of second LEDs 425 arranged on a back plate 422 in a directional LED array. Specifically, the second LEDs 425 include multiple groups of LEDs arranged in the directional LED array, such that each group of the second LEDs 425 covers a range of simulated directions. The first LEDs 415 and the second LEDs 425 may both include LEDs in different colors. For example, in certain embodiments, each set of the first LEDs 415 and the second LEDs 425 may include a plurality of red (R) LEDs, a plurality of green (G) LEDs and a plurality of blue (B) LEDs, such that the transparent LED display panel 410 may display color images, and the directional backlight module 420 may emit the collimated directional light with tunable colors. The quantity and arrangement of the second LEDs 425 may be the same as or different from those of the first LEDs 415. Further, the transparent LED display panel 410 may emit some of the light backward (i.e., toward the back side 412 and not toward the display side 414), and room light may transmit backward through the transparent LED display panel 410 toward the directional backlight module 420. Thus, the back plate 422 of the directional backlight module 422 should be blackened to absorb the backward light in order to preserve the contrast of the image or image frames displayed by the transparent LED display panel 410. In certain embodiments, the back plate 422 may be formed by a printed circuit board (PCB). Moreover, each of the transparent LED display panel 410 and the directional backlight module 420 may include other electrical components not shown in FIG. 4B, such as the pixel circuits, signal lines and controlling integrated circuits (ICs), which are not elaborated herein.

Figure 4C:
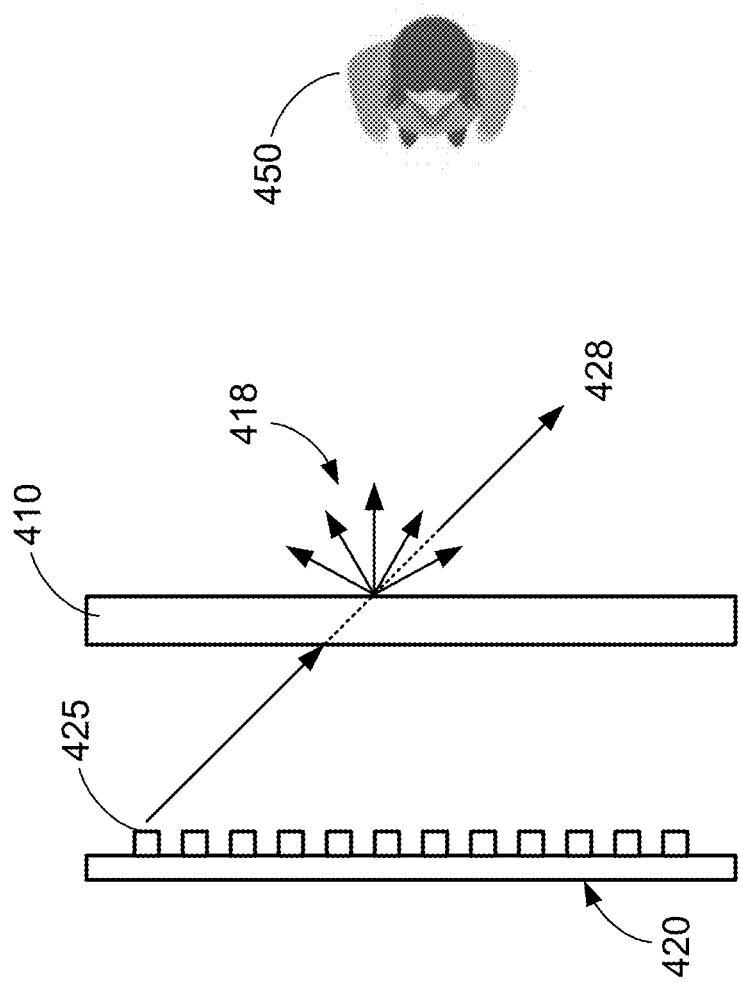
FIG. 4C schematically shows emission of the directional light and light displaying the image provided by the artificial window as shown in FIG. 4A.

FIG. 4C schematically shows emission of the directional light and light displaying the image provided by the artificial window as shown in FIG. 4A. As shown in FIG. 4C, the collimated directional light 428 generated by the directional backlight module 420 may be directed to a direction, which may be directed toward or away from the eyes of the viewer 450. In comparison, the light 418 emitted by the transparent LED display panel 410 is used for displaying the image or image frames, and may be a wide angle light spreading through a viewing range. If the collimated directional light 428 is directed away from the eyes of the viewer 450, the contrast of the image displayed by transparent LED display panel 410 will hardly be affected.

Figure 5A:
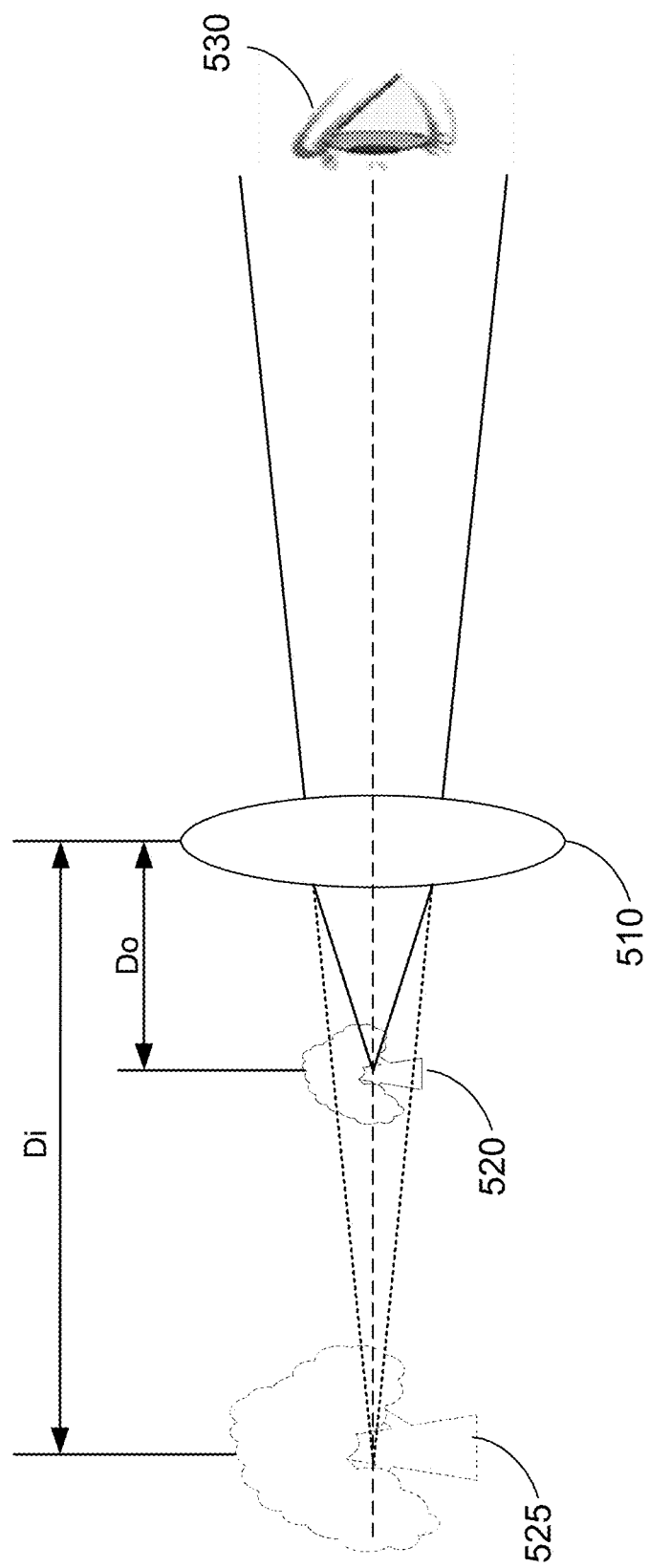
FIG. 5A shows a positive Fresnel lens as an optical component according to certain embodiments of the present disclosure.

As discussed above, the optical component 430 is used for increasing the perception of depth of the image or the image frames displayed by the transparent LED display panel 410. In certain embodiments, the optical component 430 can be a positive Fresnel lens, which works essentially as a magnifying glass. Alternatively, in certain embodiments, the optical component 430 can be a positive metalens, which is also a flat optical element. In the following example using a positive Fresnel lens, a positive metalens could also be used and similar focal length, magnification, optical quality, off-axis performance considerations would apply. FIG. 5A shows a positive Fresnel lens as an optical component according to certain embodiments of the present disclosure. As shown in FIG. 5A, a positive Fresnel lens 510 having a focal length f is provided between the object 520 (i.e., the image displayed by the transparent LED display panel 410) and a viewer 530, and the distance between the object 520 and the positive Fresnel lens 510 is Do. If the distance Do between the object 520 and the Fresnel lens 510 is less than the focal length f (i.e., Do<f), the object 520 will be magnified and a virtual image 525 will appear behind the object 520 at a perceived location with a distance Di away from the positive Fresnel lens 510. The distances Do and Di can be calculated by the lens equation as follows:

$$Di = 1 \Big/ \left(\frac{1}{f} + \frac{1}{Do}\right) \quad (1)$$

Similarly, the height Ho of the object 520 and the height Hi of the virtual image 525 can be calculated by the height equation as follows:

$$Hi = Di \times Ho/Do \quad (2)$$

Specifically, the distances Do and Di are represented in negative values because the objects 520 and the virtual image 525 are both located at the opposite side of the positive Fresnel lens 510 from the viewer 530. Further, it is desired that the value of the distance Di is large, such that the virtual image 525 is perceived to be located farther back from the positive Fresnel lens 510. Thus, the distance Do should be close to (−f). In this case, the value of the height Hi of the virtual image 525 is also increased.

With the magnification effect of the positive Fresnel lens 510, the object 520 (i.e., the image being displayed by the transparent LED display panel) can be scaled down, such that the virtual image 525 appears to be naturally sized to the viewer 530. This approach works provided that the resolution of the transparent LED display panel is high enough, such that individual pixels are not resolved by the viewer. However, while the positive Fresnel lens 510 is used at a place where the virtual image 525 is far enough back and good head motion parallax is achieved, the magnification of the pixels of the transparent LED display panel 410 may be excessive, and pixelization may be very noticeable.

There are a number of specific considerations for the implementation of the Fresnel lens. One consideration relates to the optical quality of the Fresnel lens as the optical component. By virtue of its thinness, the Fresnel lens appears to be the best option for the optical component for the artificial window. However, Fresnel lenses are also known to be difficult to use for imaging applications. The Fresnel lens being used in the artificial window should be provided with high optical quality to preserve the sharpness of the image displayed, and the groove pitch of the Fresnel lens should be small enough to avoid visible artifacts, such as unintended light reflection, diffraction, visibility of the Fresnel zone pattern, and image blurring or contrast loss. The Fresnel lens should be flat and non-yellowing. Currently, large Fresnel lenses have been manufactured and used for rear projection TVs, and some of the manufacturing techniques could be applied. A high-quality Fresnel lens may be manufactured using acrylic on glass microreplication techniques.

Another consideration of the Fresnel lens is the focal length of the Fresnel lens: In application, the physical depth of an artificial window should be small enough that it can be retrofitted or recessed into an interior wall, which means the assembly total thickness of the artificial window should be limited to a certain threshold thickness, such as no more than ~10 cm. To achieve this requirement, the distance between the Fresnel lens and the transparent LED display panel should be less than 8 cm to account for the transparent LED display panel and Fresnel lens thickness, and the focal length of the Fresnel lens should be slightly larger. For such a large aperture lens, the focal length (hereinafter referred to as the f-number) is a very short. For example, a 1 meter diagonal artificial window with a focal length of around 0.1 meter would have a f-number of ~0.1. While Fresnel lenses having the focal length f of around 0.5 are common, a positive Fresnel lens with the f-number of ~0.1 would be considered very aggressive. As provided below, Table 1 shows the relationships between the f-number, the virtual image distance and the magnification of a 1 meter diagonal artificial window with the distance Do of 0.1 meter.

TABLE 1

| F-number | Virtual Image Distance (m) | Magnification |
|---|---|---|
| 0.5 | −0.13 | 0.13 |
| 0.4 | −0.13 | 0.13 |
| 0.3 | −0.15 | 0.15 |
| 0.2 | −0.20 | 0.20 |
| 0.15 | −0.30 | 0.30 |
| 0.14 | −0.35 | 0.35 |
| 0.13 | −0.43 | 0.43 |
| 0.12 | −0.60 | 0.60 |
| 0.11 | −1.10 | 1.10 |
| 0.105 | −2.10 | 2.10 |
| 0.101 | −10.10 | 10.10 |

A further consideration relates to the off-axis performance: Given typical viewer distance from the window of ~0.35 meter for a 1 meter diagonal artificial window, a horizontal field of view of up to ~120 degrees is required, which means that the optical component should ideally perform well at up to 60 degrees off-axis. There should be minimal color fringing or scattering.

Figure 5B:
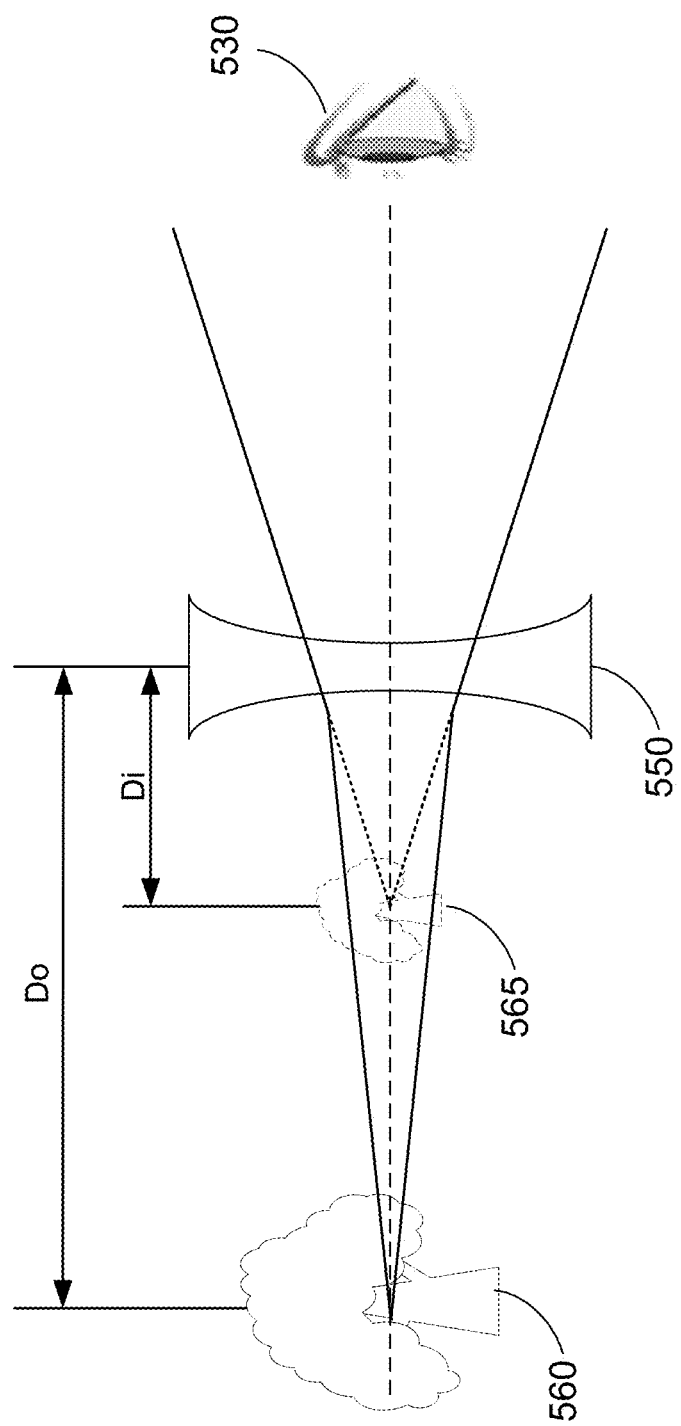
FIG. 5B shows a negative Fresnel lens as an optical component according to certain embodiments of the present disclosure.

Alternatively, the optical component may be a negative Fresnel lens such that it behaves as a concave lens. Alternatively, in certain embodiments, the optical component can be a negative metalens, which is also a flat optical element. In the following example using a negative Fresnel lens, a negative metalens could also be used and similar focal length, minification, optical quality, off-axis performance considerations would apply. FIG. 5B shows a negative Fresnel lens as an optical component according to certain embodiments of the present disclosure. As shown in FIG. 5B, a negative Fresnel lens 550 having a focal length f is provided between the object 560 (i.e., the image displayed by the transparent LED display panel 410) and a viewer 530, and the distance between the object 560 and the negative Fresnel lens 550 is Do. If the distance Do between the object 560 and the concave lens 550 is larger than the focal length f (i.e., Do>f), the object 560 will be minified and a virtual image 565 will appear between the object 560 and the negative Fresnel lens 550 at a perceived location with a distance Di away from the negative Fresnel lens 550. The distances Do and Di can be calculated by the lens equation as follows:

$$Do = 1 \Big/ \left( \frac{1}{f} + \frac{1}{Di} \right) \tag{3}$$

Similarly, the height Ho of the object 560 and the height Hi of the virtual image 565 can be calculated by the height equation as follows:

$$Hi = Di \times Ho/Do \tag{4}$$

Specifically, the distances Do and Di are represented in negative values because the objects 560 and the virtual image 565 are both located at the opposite side of the negative Fresnel lens 550 from the viewer 530. Further, it is desired that the value of the distance Do is relatively small, but still larger in magnitude than f, such that the location of the object 560 (i.e., the transparent LED display panel) is not too far from from the negative Fresnel lens 550. Thus, the distance Di should be close to (−f). In this case, the value of the height Hi of the virtual image 525 is also increased.

The advantage of the configuration using the negative Fresnel lens 550 as the optical component is that the image being displayed by the transparent LED display panel is further minified, such that individual pixels are not resolvable even when standing close to the artificial window. Further, the negative Fresnel lens 550 may increase the divergence of the light coming from the transparent LED display panel, and thus enables the use of a more collimated backlight while preserving viewing angle. While the negative Fresnel lens moves the effective focal plane of the virtual image closer to the viewer 530, the head motion parallax effect will outweigh the focal distance cue to the viewer 530, and the viewer 530 still perceives a realistic enough virtual window view.

As discussed above, when a positive Fresnel lens is located at a place where the virtual image is far enough back and good head motion parallax is achieved, the magnification of the pixels is excessive such that pixelization is very noticeable. In comparison, a negative Fresnel lens provides both good head motion parallax and invisible pixels while the apparent focal plane, though closer than desired, is not disruptive to the artificial window effect. The negative Fresnel lens allows the artificial window to have a reasonably small depth, weight and cost. For similar reasons as stated in the positive Fresnel lens implementation, the negative Fresnel lens would require precision design and manufacturing, and perhaps optical coatings to avoid objectionable image artifacts and room light reflections.

Figure 6:
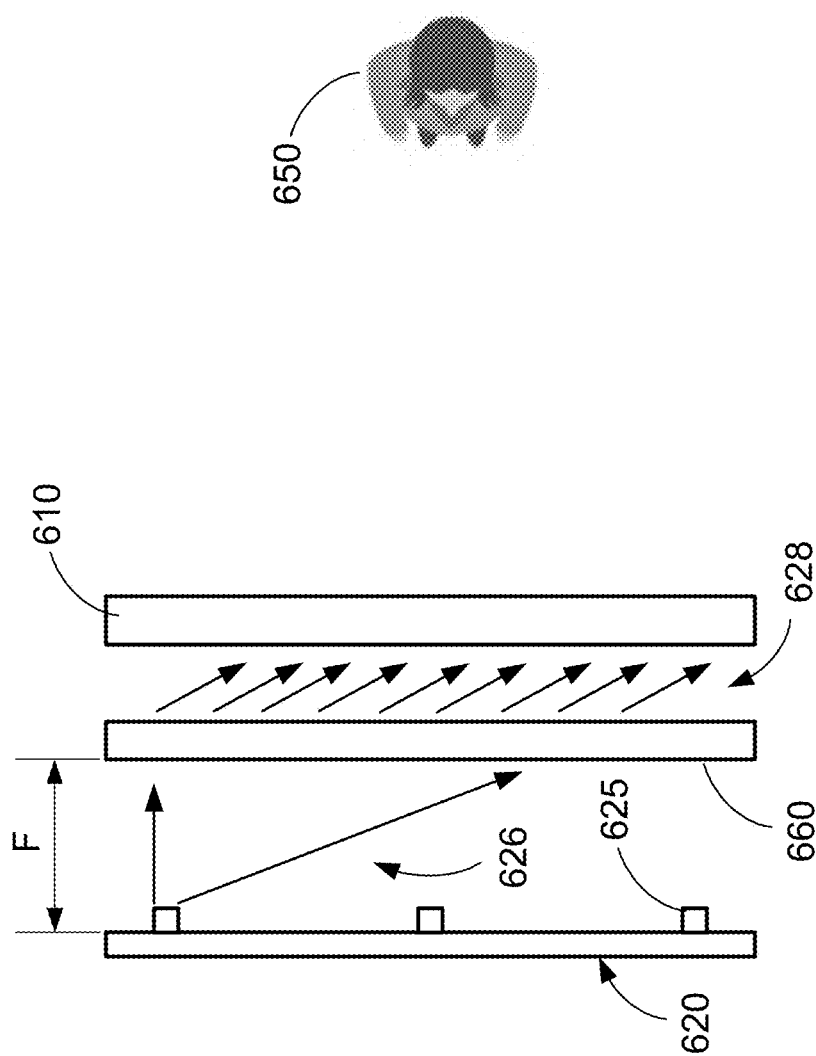
FIG. 6 shows a side view of an artificial window having a transparent LED display panel and a directional backlight module according to certain embodiments of the present disclosure, where the directional backlight module includes an additional lens.

As shown in FIG. 4C, the directional backlight module 420 includes a plurality of second LEDs 425 arranged in multiple groups, such that each group of the second LEDs 425 covers a range of simulated directions. However, to cover a wide range of simulated directions, the cost of the directional backlight module 420 will be significant due to a large quantity of the second LEDs 425. In this case, it is desired that the quantity of the second LEDs 425 should be reduced, in order to achieve a balance between a reasonable quantity of the second LEDs 425 and the coverage of a reasonable range of simulated directions. In certain embodiments, this can be done by providing an additional optical component in the directional backlight module. For example, FIG. 6 shows a side view of an artificial window having a transparent LED display panel and a directional backlight module according to certain embodiments of the present disclosure. Specifically, comparing the artificial window as shown in FIG. 6 to the one as shown in FIGS. 4A-4C, the directional backlight module 620 in FIG. 6 may include an additional optical component, such as a lens 660, which is located between the second LEDs 625 and the transparent LED display panel 610. The difference between this additional lens 660 and the optical component 430 as shown in FIG. 4A exists in that the optical component 430 is located between the transparent LED display panel 410 and the viewer 450, and the lens 660 as shown in FIG. 6 is located between the transparent LED display panel 610 and the second LEDs 625. In other words, the optical component 430 is a front optic located at the display side 414 of the transparent LED display panel 410, and in comparison, the lens 660 is located at a back side of the transparent LED display panel 610 such that the viewer 650 does not see the lens 660. The positions of the second LEDs 625 and the lens 660 can be discretely designed, such that the light 626 emitted by the second LEDs 625 may spread over the full surface of the lens 660, and then pass the lens 660 to become the collimated directional light 628 in the desired collimated directions. Thus, the quantity of the second LEDs 625 may be reduced, and a balance between a reasonable quantity of the second LEDs 625 and the coverage of a reasonable range of simulated directions may be achieved. In certain embodiments, the lens 660 may be a Fresnel lens. In other embodiments, the lens 660 may be a metalens. In this case, the directional backlight module 620 may be located at a position spaced approximately a focal length F from the lens 660, such that the light 626 emitted by the second LEDs 625 and spreading over the full surface of the lens 660 may be collimated by the lens 625. Since the second LEDs 625 are discretely positioned, the angles of the collimated directional light 628 emerging from the lens 660 are effectively quantized, and the quantity of the second LEDs 625 should be high enough to avoid obvious angle quantization artifacts.

Figure 7:
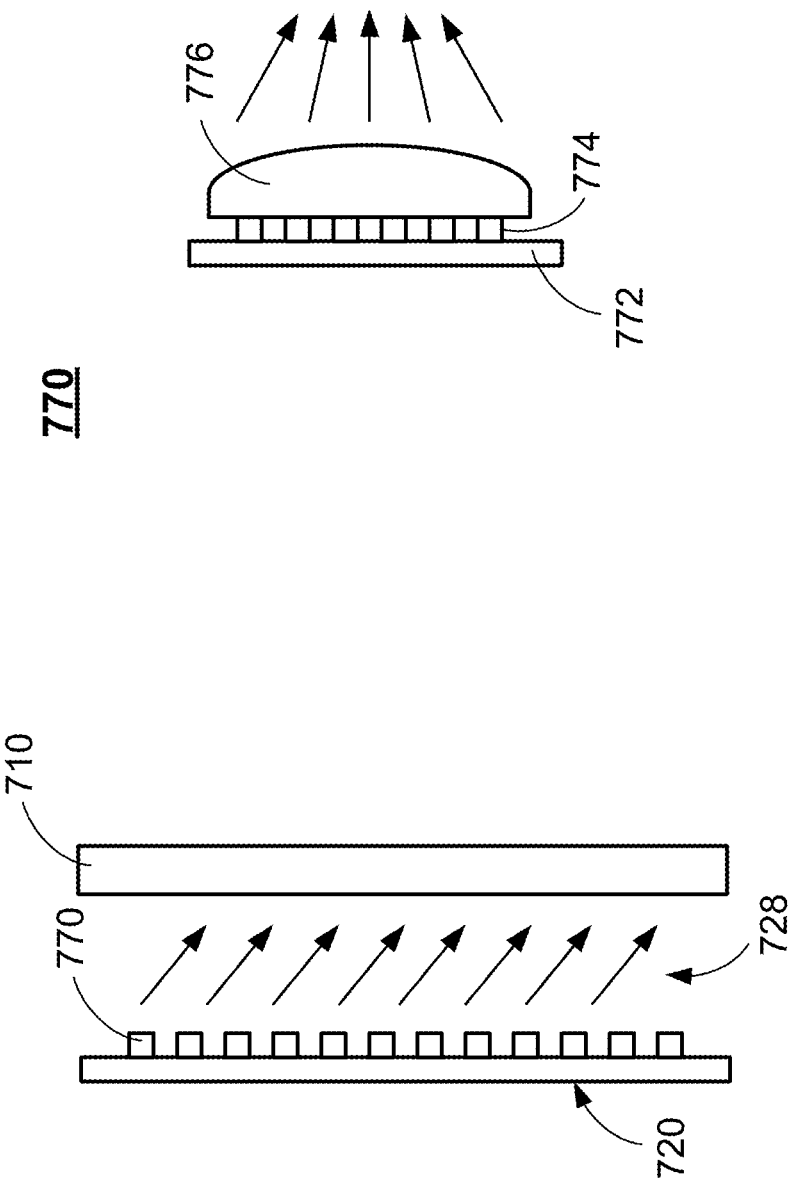
FIG. 7A shows a side view of an artificial window having a transparent LED display panel and a directional backlight module according to certain embodiments of the present disclosure, where the directional backlight module includes multiple LED array modules.
FIG. 7B shows an enlarged view of one LED array module as shown in FIG. 7A.

It should be noted that, in the embodiment as shown in FIG. 6, the overall depth of the artificial window is increased because of the use of the lens 660, since a distance of the focal length F between the lens 660 and the second LEDs 625 is required. Since the focal length F of a Fresnel lens is on the order of its diagonal size, the overall size of the artificial window will also be increased. In certain embodiments, the configuration of the directional backlight module 620 may be further changed to provide a low depth artificial window. For example, FIG. 7A shows a side view of an artificial window having a transparent LED display panel and a directional backlight module according to certain embodiments of the present disclosure. Specifically, comparing the artificial window as shown in FIG. 7A to the one as shown in FIGS. 4A-4C, the directional backlight module 720 in FIG. 7A may include multiple LED array modules 770 to replace the second LEDs 425. FIG. 7B shows an enlarged view of one LED array module as shown in FIG. 7A, in which the LED array module 770 includes a plurality of second LEDs 774 formed on a back plate 772, and a micro-lens 776. In other words, each LED array module 770 has a respective micro-lens 776 corresponding to multiple second LEDs 774. The function of the micro-lens 776 is essentially identical to the lens 660 as shown in FIG. 6. However, instead of providing a full-sized lens 660 for the whole directional backlight module, multiple micro-lenses 776 may be provided to form multiple LED array modules 770. Thus, the LED array modules 770 may directly project the collimated directional light 728 toward the transparent LED display panel 710. In certain embodiments, each micro-lens 776 can be a Fresnel lens. Since the focal length F of a Fresnel lens is on the order of its diagonal size, the size and focal length of the micro-lenses 776 can be significantly reduced, thus allowing the overall depth of the artificial window to be reduced. In other embodiments, the lens 776 may be a metalens.

Figure 8:
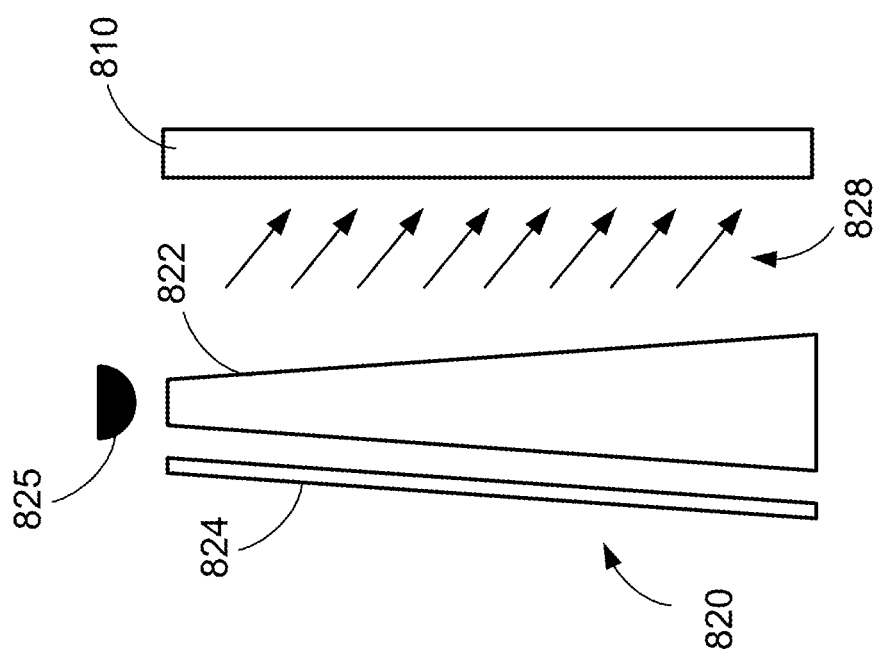
FIG. 8 shows a side view of an artificial window having a transparent LED display panel and a directional backlight module according to certain embodiments of the present disclosure, where the directional backlight module includes a directional light guide plate.

FIG. 8 shows another embodiment of a low depth artificial window, where the directional backlight module includes a directional light guide plate. As shown in FIG. 8, the directional backlight module 820 is an edge type directional backlight, which has an array of second LEDs 825 located at a side edge of a directional light guide plate 822, and a reflective plate 824 located at the back side of the directional light guide plate 822. The light guide plate 822 and the reflective plate 824 may be designed to directly project the collimated directional light 828 toward the transparent LED display panel 810. In this case, the directional backlight module 820 does not need an additional optical component. Although the array of second LEDs 825 still requires the use of multiple second LEDs to form a 2-D array, the overall quantity of the second LEDs 825 can also be reduced.

Figure 9A:
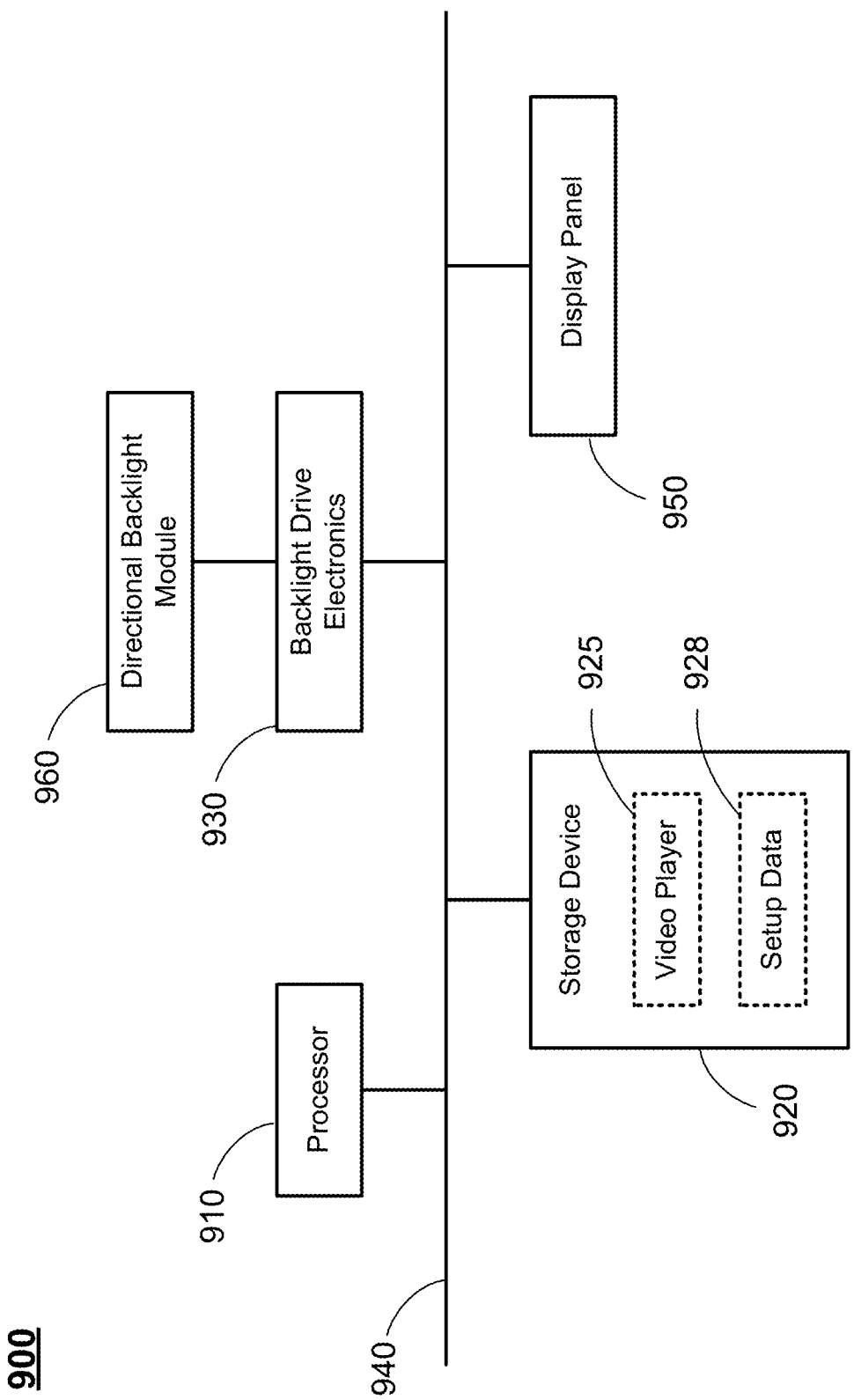
FIG. 9A shows a computing device for the artificial window according to certain embodiments of the present disclosure.

As discussed above, the computing device 440 is used to function as the controlling device for both the transparent LED display panel 410 and the directional backlight module 420. FIG. 9A shows a computing device for the artificial window according to certain embodiments of the present disclosure. As shown in FIG. 9A, the computing device 900 includes a processor 910, a storage device 920, and multiple backlight drive electronics 930 connected to the directional backlight module 960. A connection bus 940 is provided to interconnect all the components of the computing device 900 as well as the display panel 950. The computing device 900 may also include other hardware components and software components (not shown) to perform other corresponding tasks. In certain embodiments, the display panel 950 can be the transparent LED display panel as described above, and the directional backlight module 960 can be the directional backlight module as described above. The storage device 920 stores computer executable software codes which, when executed at the processor 910, may implement the operations of the computing device 900. Examples of the operations may include, without being limited thereto, analysis of the image or video being displayed by the display panel 950, control to the display panel 950 for displaying the image or video, and control to the directional backlight module 960 for generating the collimated directional light. For example, the computer executable codes may include a video player 925 and setup data 928. The video player 925 is a software module to control the display panel 950 and the directional backlight module 960, and the setup data 928 is a database module storing the data for the video player 925. In certain embodiments, when the video player 925 is executed at the processor 910, the video player 925 may perform analysis of the image frame (or frames in a video) to be displayed by the display panel 950 with a plurality of predetermined control factors, in order to determine a plurality of parameters of the collimated directional light. In certain embodiment, the analysis can be real-time on a video stream to be displayed by the display panel 950. Alternatively, when the display panel 950 is configured to display a fixed image or a pre-recorded video, the analysis can also be pre-processed prior to the actual displaying session to generate the parameters, which may then be pre-stored in the setup date 928. Once the parameters are determined, the video player 925 may control the second LEDs of the directional backlight module 960 through the backlight drive electronics 930 to generate the collimated directional light based on the parameters.

Figure 9B:
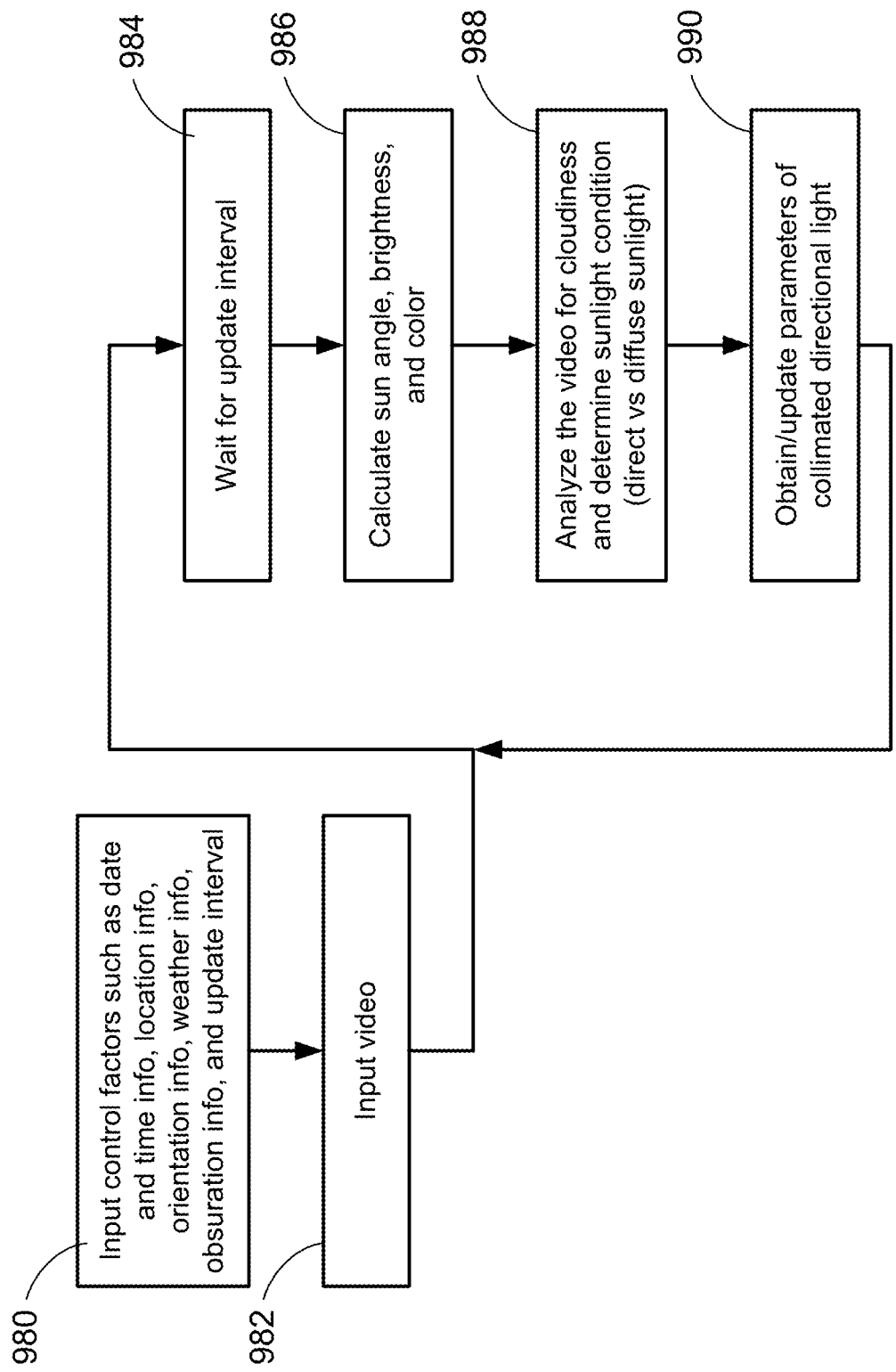
FIG. 9B shows a flowchart of analysis of the video player to generate parameters of the collimated directional light according to certain embodiments of the present disclosure.

FIG. 9B shows a flowchart of analysis of the video player to generate parameters of the collimated directional light according to certain embodiments of the present disclosure. In certain embodiments, the process as shown in FIG. 9B may be implemented by the video player 925 in the computing device 900 as shown in FIG. 9A to perform the analysis to control the directional backlight module 960 as shown in FIG. 9A. It should be particularly noted that, unless otherwise stated in the present disclosure, the steps of the method may be arranged in a different sequential order, and are thus not limited to the sequential order as shown in FIG. 9B.

As shown in FIG. 9B, at procedure 980, the video player 925 may input the control factors from the setup data 928. Examples of the control factors may include, without being limited thereto, data and time information, location information of the artificial window, orientation information of the artificial window, weather information, and obscuration information related to the image frame of the video. For example, the date and time information may include a date and time zone information. It should be noted that the date does not necessarily need to be the current date, and the time zone may be different from the actual time zone in which the artificial window is located, thus allowing the computing device to synchronize the video player 925 to the appropriate time and date for the video being displayed. The location information may include artificial window geolocation (latitude and longitude) information, or other location representation data. The orientation information may include a window direction (e.g., 0 to 360 degrees azimuth angle). In certain embodiments, when the analysis is performed real-time, the control factors may also include an update interval. For example, the update interval can be 1 second. The obscuration information relates to whether, in the video to be displayed, the sun is directly shining or is obscured by clouds. Details of the control factors will be further elaborated later.

Figure 9D:
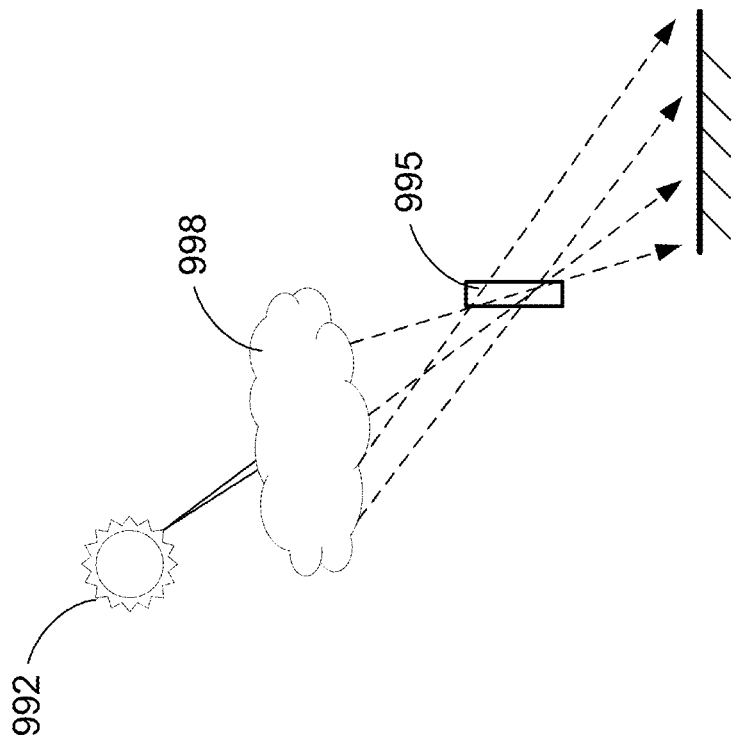
FIG. 9D schematically shows a diffuse sunlight case according to certain embodiments of the present disclosure.
Figure 9C:
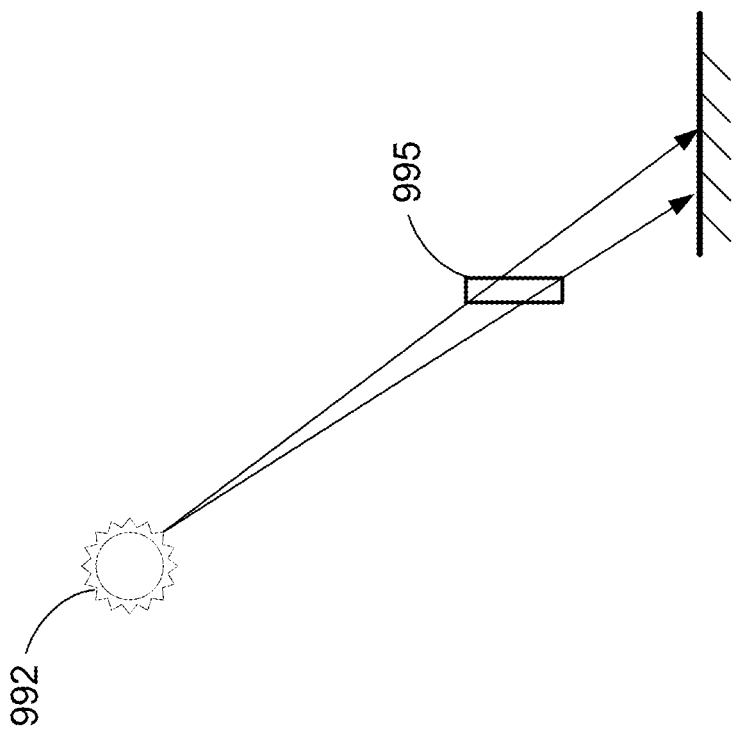
FIG. 9C schematically shows a direct sunlight case according to certain embodiments of the present disclosure.

At procedure 982, the video player 925 also inputs the video to be displayed by the display panel 950. At procedure 984, the video player 925 waits for an update interval. At procedure 986, the video player 925 calculates the sun angle, brightness and color of the sunlight (or any natural light in the video). At procedure 988, the video player 925 analyzes the video for cloudiness, and determines the sunlight condition as one of the direct sunlight case (where the sun is directly in view) and the diffuse sunlight case (where the sun is not directly in view, and only sunlight is available). For example, FIG. 9C shows a direct sunlight case in a sunny day, where the sunlight directly projects from the sun 992 to pass the window 995. In this case, the sunlight is essentially collimated, and the angle of the sunlight can be calculated depending on the time of the day and date of the year. Thus, the sunlight projects very brightly into the room, and shadows are cast, which can be mimicked by an artificial window by adding a collimated directional light with high illumination. In comparison, FIG. 9D shows a diffuse sunlight case in a cloudy day, where the sunlight is diffused by the cloud 998, and light projecting through the window fills a broader area with reduced intensity and illumination. In some cases, the color of the diffused light may also change to become faint. An artificial window may also mimic the diffused sunlight as well.

At procedure 990, the parameters of the collimated directional light are obtained and/or updated, which may then be used to generate signals for the backlight drive electronics 930 to control the directional backlight module 960. In certain embodiments, the parameters may include, without being limited thereto, a degree of collimation of the collimated directional light, a principle direction of the collimated directional light, luminance of the collimated direction light, and chromaticity of the collimated direction light. Details of the parameters will be further elaborated later.

In certain embodiments, the control factors may involve more complicated multi-factor processing. For example, if the artificial window is internet connected (such as an Internet-of-things type device), the date and time information may be accessible on the web, and the weather information may also involve periodically accessing online weather data for a given location. Alternatively, a weather classifier learning model may be used in a deep learning neural network image processor, and the date and time information and location information may be inferred over time using the machine learning image processing.

It should be noted that the analysis may not always require all of the control factors. For example, if the video has been pre-processed to generate the parameters pre-stored in the setup date 928, the video player 925 may only require the date and time information to acquire the appropriate parameters pre-stored in the setup date 928. However, using multiple control factors may greatly improve the realism of the artificial window.

Figure 10A:
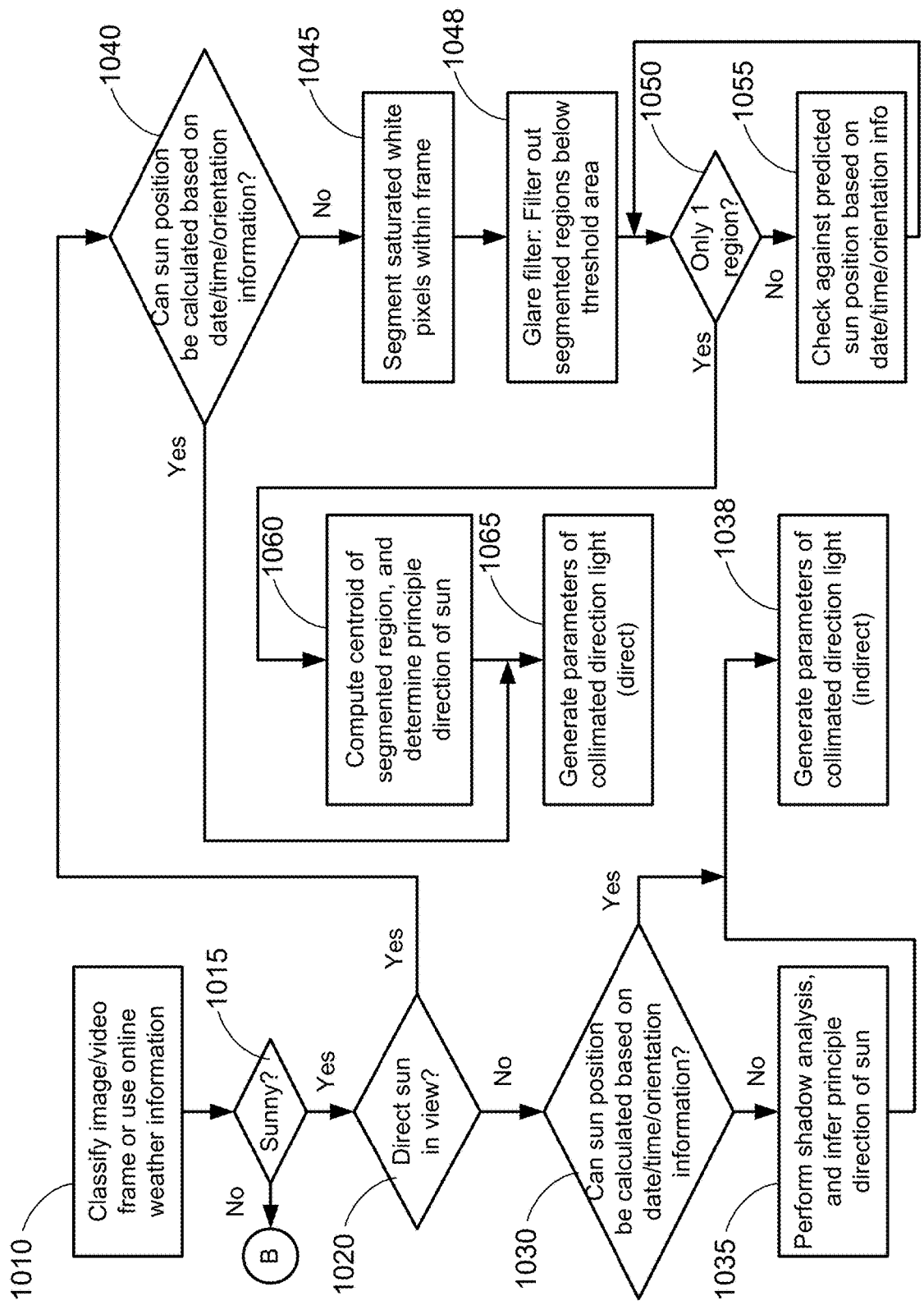
FIG. 10A shows a flowchart of a sunny day analysis of the video player to generate parameters of the collimated directional light according to certain embodiments of the present disclosure.
Figure 10B:
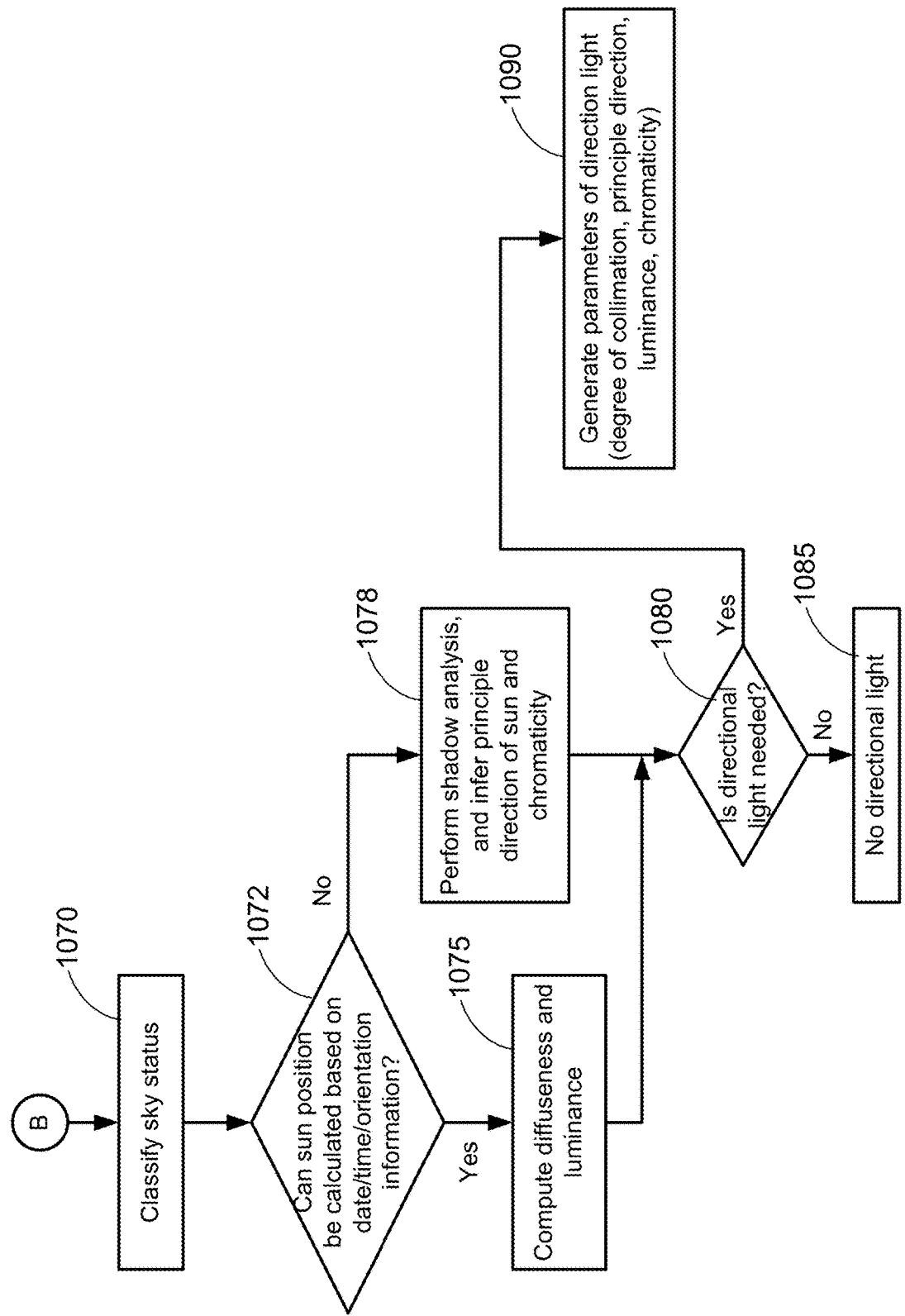
FIG. 10B shows a flowchart of a cloudy day analysis of the video player to generate parameters of the collimated directional light according to certain embodiments of the present disclosure.

FIGS. 10A and 10B shows a flowchart of a weather-based analysis of the video player to generate parameters of the collimated directional light according to certain embodiments of the present disclosure. Specifically, FIG. 10A shows the sunny day analysis, and FIG. 10B shows the cloudy day analysis. In certain embodiments, the process as shown in FIGS. 10A and 10B may be implemented by the video player 925 in the computing device 900 as shown in FIG. 9A to perform the analysis to control the directional backlight module 960 as shown in FIG. 9A. It should be particularly noted that, unless otherwise stated in the present disclosure, the steps of the method may be arranged in a different sequential order, and are thus not limited to the sequential order as shown in FIGS. 10A and 10B.

As shown in FIG. 10A, at procedure 1010, an image/video frame is performed by a weather classifier or analyzed using online weather information. At procedure 1015, the weather is determined as a sunny day or a cloudy day. If the weather is determined to be sunny, at procedure 1020, a determination as to whether direct sunlight case exists is performed. If the determination results in negative (i.e., no direct sun in view by the viewer), at procedure 1030, the video player 925 determines whether the sun position can be directly calculated based on the control factors (e.g., the date and time information and the orientation information). If the sun position can be directly calculated, at procedure 1038, the principle direction of the sun is calculated as the parameters of the collimated directional light. In certain embodiments, the principle direction of the collimated directional light (i.e., the principle direction of the sun) can be expressed as an azimuth angle $\theta$ and an elevation angle $\varphi$. If the sun position cannot be directly calculated, an additional step at procedure 1035 is required to perform the shadow analysis in order to infer the principle direction of the sun. In either case, the collimated directional light being determined at procedure 1038 is indirect.

Referring back to procedure 1020, if the determination results in positive (i.e., direct sun in view), at procedure 1040, the video player 925 determines whether the sun position can be directly calculated based on the control factors (e.g., the date and time information and the orientation information). If the sun position can be directly calculated, at procedure 1065, the principle direction of the sun is calculated as the parameters of the collimated directional light. On the other hand, if the sun position cannot be directly calculated, at procedure 1045, the video player 925 segments saturated white pixels (which indicate one or more possible sun positions) within the image/video frame. Then, at procedure 1048, a glare filter with a threshold is performed by filtering out segmented regions below the threshold, thus reducing the possible regions for the sun position. If multiple possible regions are available, only one region is selected as the sun position. At procedure 1050, the video player 925 determines whether only one region is left. If two or more regions remain available, at procedure 1055, the video player 925 checks against the predicted sun position based on the control factors (e.g., the date and time information and the orientation information) to further eliminate the unlikely position(s). If only one region remains, at procedure 1060, the video player 925 computes a centroid of the segmented region, and determines the principle direction of the sun. Finally, at procedure 1065, the principle direction of the sun is used as the parameters of the collimated directional light. In either case, the collimated directional light being determined at procedure 1065 is direct.

Referring back to procedure 1015, if the weather is determined to be cloudy, at procedure 1070 as shown in FIG. 10B, the video player 925 first classifies the sky status of the frame based on the cloudiness. In certain embodiments, the sky status may be classified as being one of the following status: foggy, stratus thin, stratus thick, thin closely broken, thick closely broken, thin widely broken, or thick widely broken. Then, at procedure 1072, the video player 925 determines whether the sun position (which is pre-obscuration) can be directly calculated based on the control factors (e.g., the date and time information and the orientation information). If the pre-obscuration sun position can be directly calculated, at procedure 1075, the video player 925 not only calculates the principle direction of the sun, but also computes the diffuseness and luminance of the light based on the sky status. Referring back to procedure 1072, if the pre-obscuration sun position cannot be directly calculated, at procedure 1078, it is required to perform the shadow analysis in order to infer the principle direction of the sun as well as the chromaticity. At procedure 1080, the video player 925 determines whether the directional light is needed. If it is determined that no directional light is needed, at procedure 1085, no action will be performed, and no directional light will be provided. If it is determined that the directional light is still needed, at procedure 1090, the parameters of the collimated directional light are determined to include the degree of collimation, the principle direction, luminance, and chromaticity.

Once the parameters of the collimated directional light are determined, the video player 925 may perform further translation to the parameters in order to generate the control signals for the backlight drive electronics 930 to output to the directional backlight module 960. In certain embodiments, the control signals are in the form of different current levels corresponding to the second LEDs of the directional backlight module. In certain embodiments, additional current limiting and thermal overload detection features may be required to avoid overdriving the second LEDs or overheating.

In all of the embodiments as described above, the artificial window in each embodiment is formed using a transparent LED display panel. In certain embodiments, the artificial window may also be formed using a liquid crystal display (LCD) panel. For example, FIG. 11A shows a side view of an artificial window according to certain embodiments of the present disclosure. As shown in FIG. 11A, the artificial window 1100 includes a LCD panel 1110, a directional backlight module 1120, an optical component 1130, and a computing device 1140. The functions of the optical component 1130 and the computing device 1140 are identical or similar to the optical component 430 and the computing device 440 as shown in FIG. 4A, and are not hereinafter elaborated. The LCD panel 1110 is a display panel, which has a back side 1112 and a display side 1114 opposite to each other, where a viewer 1150 is located at the display side 1114 of the LCD panel 1110 while viewing through the artificial window 1100 to perceive the scenery. The directional backlight module 1120 is located at the back side 1112 of the LCD panel 1110. Specifically, the directional backlight module 1120 is a multi-functional backlight module, which is used for (1) serving as a light source for the LCD panel 1110, and (2) generating a collimated directional light toward the LCD panel 1110, such that the collimated directional light simulates a natural light effect for the image or the image frames displayed by the LCD panel 1110. In other words, the directional backlight module 1120 provides both the typical LCD backlight functions and additional directional backlight features. With the LCD backlight provided by the directional backlight module 1120, the LCD panel 1110 may display a fixed image (which constitutes only one single image frame) or a video (which may include multiple image frames) of the scenery.

It should be noted that, as shown in FIG. 11A, the LCD panel 1110 is used as the display panel. However, other types of display panels working with the directional backlight module 1120 may be used to replace the LCD panel 110. For example, the display panel may be an electrowetting display panel, a microelectromechanical systems (MEMS) display panel, or other types of display panel.

Figure 11B:
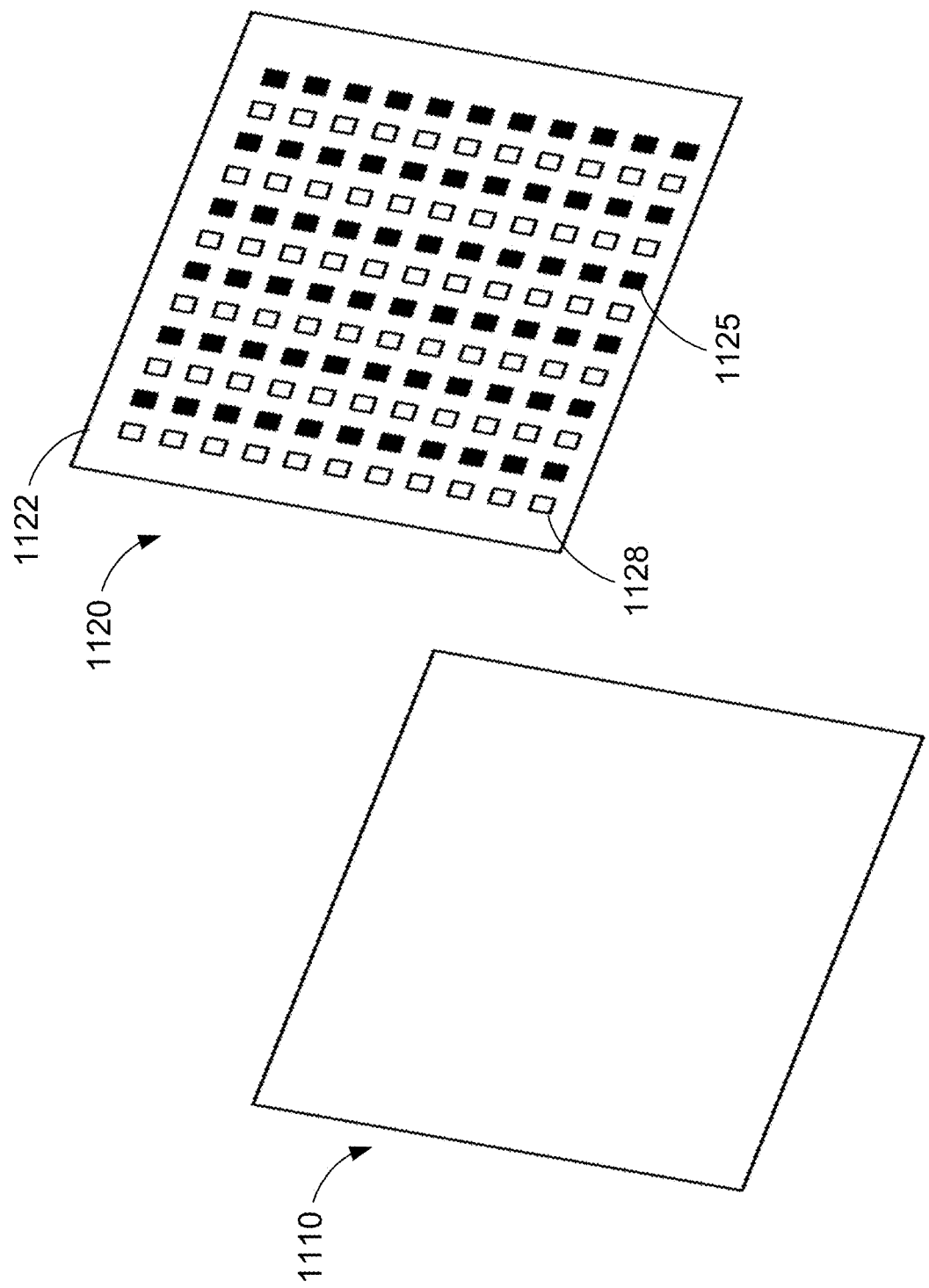
FIG. 11B shows a perspective view of the LCD panel and the directional backlight module as shown in FIG. 11A.

FIG. 11B shows a perspective view of the LCD panel and the directional backlight module as shown in FIG. 11A. As shown in FIG. 11B, the directional backlight module 120 includes a plurality of LEDs arranged on a back plate 1122. Specifically, the LEDs of the directional backlight module 120 are arranged in two sets, including a plurality of first LEDs 1125 providing backlight for the LCD panel 1110, and a plurality of second LEDs 1128 configured to generate a collimated directional light. The first LEDs 1125 and the second LEDs 1128 are alternately arranged to form respective arrays. In certain embodiments, the first LEDs 1125 and the second LEDs 1128 may be OLEDS, and may both include LEDs in different colors. In certain embodiments, the LEDs may be inorganic mini-LEDs or micro-LEDs. For example, in certain embodiments, the first LEDs 1125 may include a plurality of red (R) LEDs, a plurality of green (G) LEDs and a plurality of blue (B) LEDs. Alternatively, the first LEDs 1125 may all be LEDs in one color, such as white (W) color or blue (B) color. In certain embodiments, the second LEDs 425 may include a plurality of red (R) LEDs, a plurality of green (G) LEDs and a plurality of blue (B) LEDs, such that the directional backlight module 1120 may emit the collimated directional light with tunable colors. In certain embodiments, the LEDs may also be replaced by other types of light sources, such as laser light sources.

Figure 11D:
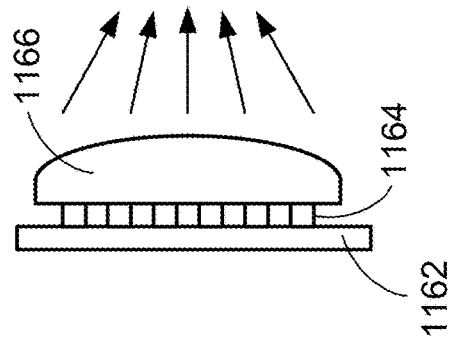
FIG. 11D shows an enlarged view of one LED array module as shown in FIG. 11C.
Figure 11E:
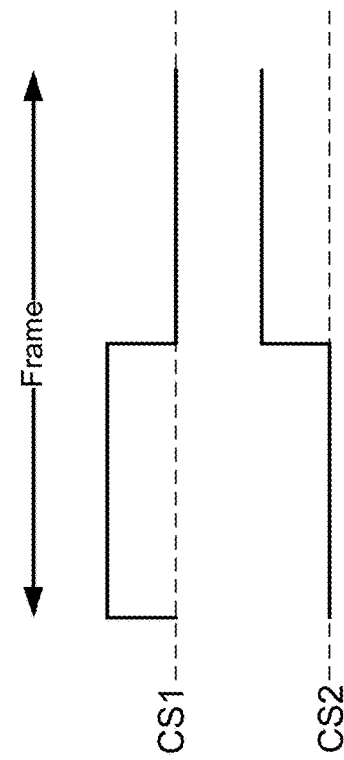
FIG. 11E shows control signals for the first LEDs and the second LEDs of the directional backlight module as shown in FIG. 11C.
Figure 11C:
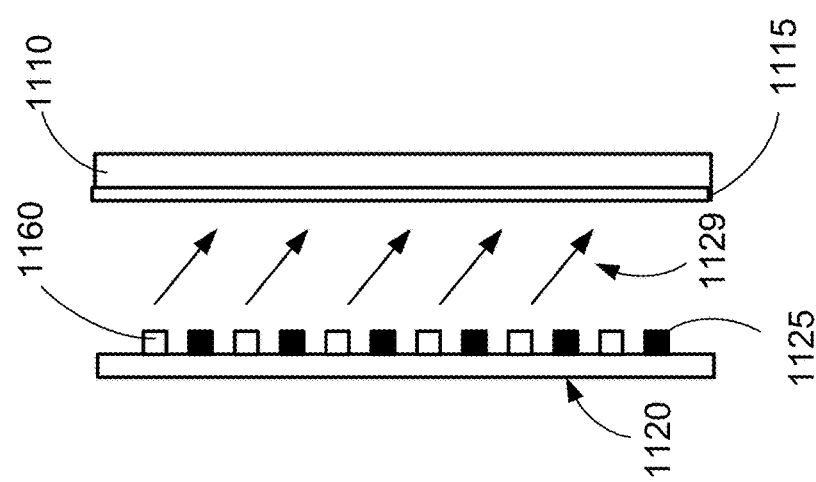
FIG. 11C shows a side view of an artificial window having a LCD panel and a directional backlight module according to certain embodiments of the present disclosure, where the LCD panel has a polarizer, and the directional backlight module includes multiple LED array modules.

FIG. 11C shows a side view of an artificial window having a LCD panel and a directional backlight module according to certain embodiments of the present disclosure. Specifically, the configuration of the artificial window 1100' is similar to the one as shown in FIG. 7A. As shown in FIG. 11C, the directional backlight module 1120 in FIG. 11A include the first LEDs 1125 and a plurality of LED array module 1160. FIG. 11D shows an enlarged view of one LED array module as shown in FIG. 11C, in which the LED array module 1160 includes a plurality of second LEDs 1164 formed on a back plate 1162, and a micro-lens 1166. In other words, each LED array module 1160 has a respective micro-lens 1166 corresponding to multiple second LEDs 1164. The function of the micro-lens 1166 performs as the lens between the second LEDs 1164 and the LCD panel 1110. Thus, the LED array modules 1160 may directly project the collimated directional light 1129 toward the LCD panel 1110. In certain embodiments, each micro-lens 1166 can be a Fresnel lens. Since the focal length F of a Fresnel lens is on the order of its diagonal size, the size and focal length of the micro-lenses 1166 can be significantly reduced, thus allowing the overall depth of the artificial window to be reduced.

Referring back to FIG. 11C, the LCD panel 1110 includes a polarizer 1115 located at the side facing the directional backlight module 1120. The polarizer 1115 is provided because the collimated directional light provided by the second LEDs 1128 and the backlight light provided by the first LEDs 1125 are not provided at the same time. Specifically, FIG. 11E shows control signals for the first LEDs and the second LEDs of the directional backlight module as shown in FIG. 11C. As shown in FIG. 11E, in a respective image or video frame, the frame includes a first half-frame and a second half-frame. In the first half-frame, a first control signal CS1 for the first LEDs 1125 is ON, such that the first LEDs 1125 are controlled to provide backlight for the LCD panel 1115 to display the respective frame, and a second control signal CS2 for the second LEDs 1128 is OFF such that the second LEDs 1128 are turned off. In the second half-frame, the first control signal CS1 is OFF such that the first LEDs 1125 are turned off, and the second control signal CS2 is ON such that the second LEDs 1128 are controlled to generate the collimated directional light. For a LCD panel 1110 with a 120 Hz frame rate, a frame (which is a combined frame related to displaying and the collimated directional light) is about 16 milliseconds (ms). In this case, the image is displayed for a half-frame, i.e., for 8 milliseconds, and then the collimated directional light is transmitted for 8 milliseconds. In this case, the first LEDs 1125 and the second LEDs 1128 are not turned on or off at the same time, and only one set of the first LEDs 1125 and the second LEDs 1128 is turned on at any time. Thus, when the second LEDs 1128 are turned on to provide the collimated directional light, the LCD panel 1110 is in the highest gray level mode without showing the image frame. In other words, the collimated directional light and the backlight for the image being displayed are provided in alternate half-frames.

Figure 11F:
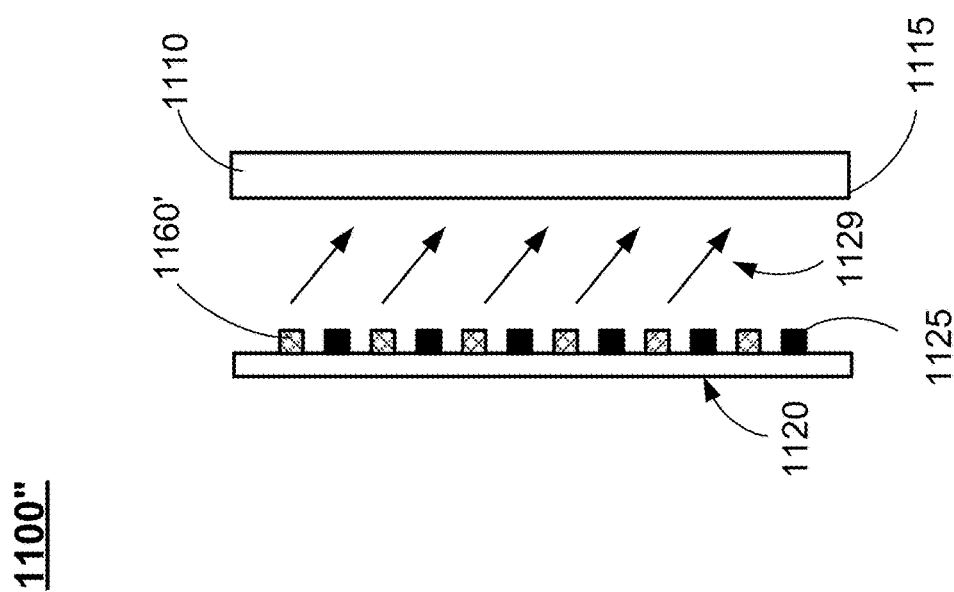
FIG. 11F shows a side view of an artificial window having a LCD panel and a directional backlight module according to certain embodiments of the present disclosure, where the LCD panel does not have a polarizer, and the directional backlight module includes multiple LED array modules with polarized second LEDs.

In the embodiment as shown in FIG. 11C, the polarizer 1115 is provided. However, this feature requires the LCD panel 1110 to display image in only 50% of a duty cycle, which likely results in loss of contrast, as well a polarization loss of the directional light. Further, this time division multiplexing scheme as shown in FIG. 11E requires a fast response liquid crystal and has a risk of loss of contrast and flicker. In certain embodiments, in the directional backlight module 1120, the first LEDs 1125 can be pre-polarized while the second LEDs 1128 remain unpolarized. This is accomplished by moving the polarizer film 1115 as shown in FIG. 11C backward (i.e., toward the directional backlight module 1120), such that the polarizer 115 is located just above the LED arrays, with holes cut out for the second LEDs. In this way, both the first LEDs and second LEDs can be on at the same time. The second LEDs, being unpolarized, partially transmit the directional light through the LCD panel 1110, regardless of the image displayed on the LCD. The main challenge with this approach is to avoid contrast loss due to polarization pollution of the standard backlight LEDs. In certain embodiments, the polarizer 1115 as shown in FIG. 11C may also be removed such that no rear polarizer is provided in the LCD panel 1110. In this case, however, the directional backlight module 1120 must be further distanced away from the LCD panel 1110 in order to achieve adequate display brightness uniformity, since the additional distance may allow any non-uniformities to blur out in the case that no polarizer is provided. To resolve this deficiency, FIG. 11F shows another embodiment of the artificial window, in which the LCD panel 1110 does not have a polarizer. In this case, the second LEDs 1162 used in the LED array modules 1160' of the directional backlight module 1120 must be polarized LEDs. In certain embodiments, the polarization of the second LEDs 1162 can be accomplished by placing a reflective polarizer film directly over the mini-LEDs. In one embodiment, the reflective polarizer film would have cut-outs for the LED array modules 1160' for directional light, such that the directional light is unpolarized and can transmit through the LCD panel 1110 regardless of the state of the LCD gray scale. In this case, the directional light can be on while the display backlight is on, and image contrast is preserved to the extent that the directional light is collimated and not pointed at the viewer.

In the embodiments as described above, only one optical component (430 as shown in FIG. 4A or 1130 as shown in FIG. 11A) is provided. In certain embodiments, however, an additional optical component may be provided at the display side of the display panel (either the transparent LED display panel 410 as shown in FIG. 4A or the LCD panel 1110 as shown in FIG. 11A) to create a more natural and 3D appearing parallax image. For example, FIG. 12 shows a side view of an artificial window having an additional transparent optical component according to certain embodiments of the present disclosure. Specifically, the artificial window 1200 as shown in FIG. 12 is similar to the one as shown in FIG. 11A, including a LCD panel 1210, a directional backlight module 1220, an optical component 1230 and a computing device (not shown). The difference exists in that an additional transparent optical component 1250 is provided between the LCD panel 1210 and the optical component 1230. In other words, the transparent optical component 1250 is located at the display side 1224 of the LCD panel 1210. The transparent optical component 1250 is used as a fixed foreground image transparency with a fixed image thereon, allowing the head movement image shift of the fixed scenery of the transparency to be less than the image shift of the displayed image, thus providing depth cues. This effect works in either case when the optical component 1230 is a positive or negative Fresnel lens. Examples of the fixed image provided by the transparent optical component 1250 may be an image of trees, structures or buildings which would be expected in the foreground all the time. Although FIG. 12 shows that the transparent optical component 1250 is provided in an artificial window using the LCD panel 1210, the transparent optical component can be utilized in any embodiments as described above.

Figure 13:
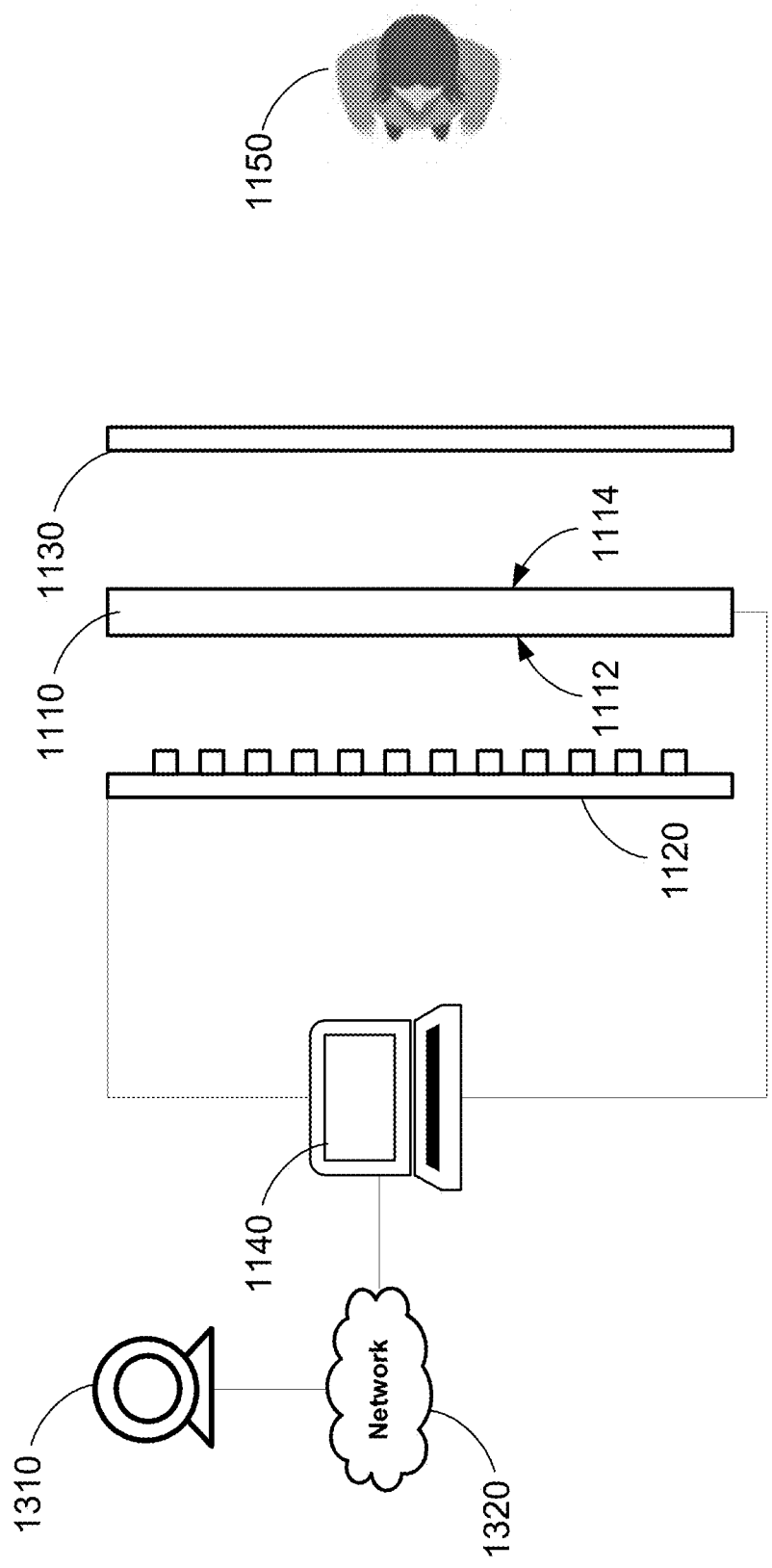
FIG. 13 shows an artificial window having a liquid crystal display (LCD) panel and a directional backlight module according to certain embodiments of the present disclosure, where the artificial window is communicatively connected to a remote camera.

FIG. 13 shows an artificial window according to certain embodiments of the present disclosure. Specifically, the artificial window 1300 as shown in FIG. 13 is similar to the artificial window 1100 as shown in FIG. 11A, with the only difference being that the artificial window 1300 further includes a remote camera 1310. Specifically, the remote camera 1310 is communicatively connected to the computing device 1140 via a network 1320, such that the remote camera 1310 may be located at a remote location away from the artificial window 1300. In this case, the remote camera 1310 may be used to obtain an image or a video (which includes at least one image frame) real-time, and the computing device 1140 may receive the image or the video from the remote camera 1310 real-time, and generate control data for the LCD panel 1100, such that the LCD panel 1100 may display the image or the video obtained by the remote camera 1310 real-time. Other features of the artificial window 1300, such as the LCD panel 1110, the directional backlight module 1120, the optical component 1130, and the computing device 1140, are similar to those as shown in FIG. 11A, and thus are not elaborated herein.

In the artificial window 1300 as shown in FIG. 13, the LCD panel 1100 may display the image or the video obtained by the remote camera 1310 real-time. Since the remote camera 1310 may be located at a remote location away from the artificial window, the control factors being involved for determining the parameters of the collimated directional light may be related to the remote camera 1310, and not the artificial window. For example, instead of using the location information and the orientation information of the artificial window, the location information and the orientation information of the remote camera 1310 may be used. Similarly, the weather information being used should also be related to the location of the remote camera 1310.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An artificial window, comprising:
   a transparent light emitting diode (LED) display panel having a back side and a display side opposite to each other, wherein the transparent LED display panel comprises a plurality of first LEDs configured to display at least one image frame;
   a directional backlight module located at the back side of the transparent LED display panel, wherein the directional backlight module comprises a plurality of second LEDs forming a directional LED array configured to generate a collimated directional light toward the transparent LED display panel; and
   a computing device comprising a processor and a storage device storing computer executable code, wherein the computer executable code, when executed at the processor, is configured to:
      analyze a plurality of control factors to determine a plurality of parameters of the collimated directional light, wherein the control factors comprise weather information, and control the second LEDs to generate the collimated directional light based on the parameters of the collimated directional light, wherein the computing device is configured to analyze the at least one image frame and the control factors to determine the parameters of the collimated directional light by:

determining, either by analyzing the at least one image frame or based on the weather information, whether the at least one image frame is in a sunny weather or a cloudy weather;

in response to determining that the at least one image frame is in the sunny weather, determining, by analyzing the at least one image frame, whether the sun is in view in the at least one image frame;

in response to determining that the sun is in view, calculating the parameters of the collimated directional light based on sun position in the at least one image frame; and in response to determining that the sun is not in view, calculating the parameters of the collimated directional light based on the date and time information, the location information and the orientation information of the artificial window, or by analyzing shadows in the at least one image frame; and in response to determining the at least one image frame is in the cloudy weather, classifying, by analyzing the at least one image frame, a sky status;

calculating a pre-obscuration parameters of the collimated directional light based on the date and time information, the location information and the orientation information of the artificial window, or by analyzing shadows in the at least one image frame; and calculating, based on the pre-obscuration parameters of the collimated directional light and the sky status, the parameters of the collimated directional light.

2. The artificial window of claim 1, wherein the second LEDs simulate a natural light effect for the at least one image frame displayed by the transparent LED display panel.

3. The artificial window of claim 1, further comprising an optical component located at the display side of the transparent LED display panel, configured to increase a perception of depth of the at least one image frame displayed by the transparent LED display panel.

4. The artificial window of claim 3, wherein the optical component is a Fresnel lens or a metalens.

5. The artificial window of claim 1, wherein the parameters of the collimated directional light comprise:
  a degree of collimation of the collimated directional light;
  a principle direction of the collimated directional light;
  luminance of the collimated direction light; and
  chromaticity of the collimated direction light.

6. The artificial window of claim 5, wherein the principle direction of the collimated directional light comprises an azimuth angle $\theta$ and an elevation angle $\varphi$.

7. The artificial window of claim 1, wherein the control factors further comprise at least one of:
  date and time information;
  location information of the artificial window;
  orientation information of the artificial window; and
  obscuration information related to the at least one image frame.

8. The artificial window of claim 1, wherein the sun position in the at least one image frame is determined by calculating the sun position based on the date and time information, the location information and the orientation information of the artificial window.

9. The artificial window of claim 1, wherein the sun position in the at least one image frame is determined by:
  analyzing the at least one image frame to obtain at least one region of saturated white pixels within the at least one image frame;
  in response to obtaining only one region of the saturated white pixels, determining the one region as the sun position; and
  in response to obtaining a plurality of region of the saturated white pixels, selecting one of the plurality of regions as the sun position based on the date and time information, the location information and the orientation information of the artificial window.

10. An artificial window, comprising:
  a display panel having a back side and a display side opposite to each other, configured to display at least one image frame, wherein the display panel has a polarizer, and each respective frame of the at least one image frame comprises a first half-frame and a second half-frame; and
  a backlight module located at the back side of the display panel, comprising a first light source providing backlight for the display panel, and a second light source configured to generate a collimated directional light, wherein:
    in the first half-frame of each respective frame, the first light source is controlled to provide backlight for the display panel to display the respective frame, and the second light source is turn off; and
    in the second half-frame of each respective frame, the first light source is turn off, and the second light source is controlled to generate the collimated directional light.

11. The artificial window of claim 10, wherein the second light source simulates a natural light effect for the at least one image frame displayed by the display panel.

12. The artificial window of claim 10, further comprising an optical component located at the display side of the display panel, configured to increase a perception of depth of the at least one image frame displayed by the display panel.

13. The artificial window of claim 12, wherein the optical component is a Fresnel lens or a metalens.

14. The artificial window of claim 10, wherein the first light source is configured to provide a polarized light beam, and the display panel is a liquid crystal display (LCD) panel not having a rear polarizer.

15. The artificial window of claim 10, further comprising a computing device comprising a processor and a storage device storing computer executable code, wherein the computer executable code, when executed at the processor, is configured to analyze a plurality of control factors to determine a plurality of parameters of the collimated directional light, and control the second light source to generate the collimated directional light based on the parameters of the collimated directional light.

16. The artificial window of claim 15, wherein the parameters of the collimated directional light comprise:
  a degree of collimation of the collimated directional light;
  a principle direction of the collimated directional light;
  luminance of the collimated direction light; and
  chromaticity of the collimated direction light.

17. The artificial window of claim 16, wherein the principle direction of the collimated directional light comprises an azimuth angle θ and an elevation angle φ.

18. The artificial window of claim 15, wherein the control factors comprise at least one of:
   date and time information;
   location information of the artificial window;
   orientation information of the artificial window;
   weather information; and
   obscuration information related to the at least one image frame.

19. The artificial window of claim 18, wherein the computing device is configured to configured to analyze the at least one image frame and the control factors to determine the parameters of the collimated directional light by:
   determining, either by analyzing the at least one image frame or based on the weather information, whether the at least one image frame is in a sunny weather or a cloudy weather;
   in response to determining the at least one image frame is in the sunny weather,
      determining, by analyzing the at least one image frame, whether the sun is in view in the at least one image frame;
      in response to determining that the sun is in view, calculating the parameters of the collimated directional light based on sun position in the at least one image frame; and
      in response to determining that the sun is not in view, calculating the parameters of the collimated directional light based on the date and time information, the location information and the orientation information of the artificial window, or by analyzing shadows in the at least one image frame; and
   in response to determining the at least one image frame is in the cloudy weather,
      classifying, by analyzing the at least one image frame, a sky status;
      calculating a pre-obscuration parameters of the collimated directional light based on the date and time information, the location information and the orientation information of the artificial window, or by analyzing shadows in the at least one image frame; and
      calculating, based on the pre-obscuration parameters of the collimated directional light and the sky status, the parameters of the collimated directional light.

20. The artificial window of claim 19, wherein the sun position in the at least one image frame is determined by calculating the sun position based on the date and time information, the location information and the orientation information of the artificial window.

21. The artificial window of claim 19, wherein the sun position in the at least one image frame is determined by:
   analyzing the at least one image frame to obtain at least one region of saturated white pixels within the at least one image frame; and
   in response to obtaining only one region of the saturated white pixels, determining the one region as the sun position; and
   in response to obtaining a plurality of region of the saturated white pixels, selecting one of the plurality of regions as the sun position based on the date and time information, the location information and the orientation information of the artificial window.

22. An artificial window, comprising:
   a display panel having a back side and a display side opposite to each other, configured to display at least one image frame, wherein the at least one image frame is obtained real-time by a remote camera;
   a backlight module located at the back side of the display panel, comprising a first light source providing backlight for the display panel, and a second light source configured to generate a collimated directional light; and
   a computing device communicatively connected to the display panel, the backlight module and the remote camera, the computing device comprising a processor and a storage device storing computer executable code, wherein the computer executable code, when executed at the processor, is configured to:
      receive the at least one image frame from the remote camera, and generate control data for the display panel based on the at least one image frame;
      receive a plurality of control factors from the remote camera, and determine a plurality of parameters of the collimated directional light, wherein the control factors comprise weather information; and
      control the second light source to generate the collimated directional light based on the parameters of the collimated directional light;
   wherein the computing device is configured to analyze the at least one image frame and the control factors to determine the parameters of the collimated directional light by:
   determining, either by analyzing the at least one image frame or based on the weather information, whether the at least one image frame is in a sunny weather or a cloudy weather;
   in response to determining the at least one image frame is in the sunny weather,
      determining, by analyzing the at least one image frame, whether the sun is in view in the at least one image frame;
      in response to determining that the sun is in view, calculating the parameters of the collimated directional light based on sun position in the at least one image frame; and
      in response to determining that the sun is not in view, calculating the parameters of the collimated directional light based on the date and time information, the location information and the orientation information of the remote camera, or by analyzing shadows in the at least one image frame; and
   in response to determining the at least one image frame is in the cloudy weather, classifying, by analyzing the at least one image frame, a sky status;
      calculating a pre-obscuration parameters of the collimated directional light based on the date and time information, the location information and the orientation information of the remote camera, or by analyzing shadows in the at least one image frame; and
      calculating, based on the pre-obscuration parameters of the collimated directional light and the sky status, the parameters of the collimated directional light.

23. The artificial window of claim 22, wherein the parameters of the collimated directional light comprise:
   a degree of collimation of the collimated directional light;
   a principle direction of the collimated directional light;
   luminance of the collimated direction light; and
   chromaticity of the collimated direction light.

24. The artificial window of claim 23, wherein the principle direction of the collimated directional light comprises an azimuth angle θ and an elevation angle φ.

25. The artificial window of claim 22, wherein the control factors further comprise at least one of:
- date and time information;
- location information of the remote camera;
- orientation information of the remote camera; and
- obscuration information related to the at least one image frame.

26. The artificial window of claim 22, wherein the sun position in the at least one image frame is determined by calculating the sun position based on the date and time information, the location information and the orientation information of the remote camera.

27. The artificial window of claim 22, wherein the sun position in the at least one image frame is determined by:
- analyzing the at least one image frame to obtain at least one region of saturated white pixels within the at least one image frame;
- in response to obtaining only one region of the saturated white pixels, determining the one region as the sun position; and
- in response to obtaining a plurality of region of the saturated white pixels, selecting one of the plurality of regions as the sun position based on the date and time information, the location information and the orientation information of the remote camera.

\* \* \* \* \*